United States Patent
Jung et al.

(10) Patent No.: US 11,099,351 B2
(45) Date of Patent: Aug. 24, 2021

(54) LENS MOVING APPARATUS, AND CAMERA MODULE AND PORTABLE DEVICE INCLUDING THE SAME

(71) Applicant: LG INNOTEK CO., LTD., Seoul (KR)

(72) Inventors: Tae Jin Jung, Seoul (KR); Sang Jun Min, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 674 days.

(21) Appl. No.: 15/790,483

(22) Filed: Oct. 23, 2017

(65) Prior Publication Data
US 2018/0113274 A1 Apr. 26, 2018

(30) Foreign Application Priority Data

Oct. 24, 2016 (KR) .................. 10-2016-0138204
Oct. 24, 2016 (KR) .................. 10-2016-0138205

(51) Int. Cl.
*G02B 7/09* (2021.01)
*H04N 5/232* (2006.01)
(Continued)

(52) U.S. Cl.
CPC ............. *G02B 7/09* (2013.01); *G02B 7/021* (2013.01); *G02B 27/646* (2013.01); *H02K 7/14* (2013.01);
(Continued)

(58) Field of Classification Search
None
See application file for complete search history.

(56) References Cited

U.S. PATENT DOCUMENTS

| | | | |
|---|---|---|---|
| 7,274,120 B2 | 9/2007 | Manabe | |
| 8,009,372 B2 * | 8/2011 | Jin | ............ G03B 3/10 359/814 |

(Continued)

FOREIGN PATENT DOCUMENTS

| | | |
|---|---|---|
| CN | 101038361 A | 9/2007 |
| CN | 104808416 A | 7/2015 |

(Continued)

OTHER PUBLICATIONS

Office Action dated Feb. 4, 2021 in Chinese Application No. 201711001250.7.

*Primary Examiner* — Clayton E. LaBalle
*Assistant Examiner* — Leon W Rhodes, Jr.
(74) *Attorney, Agent, or Firm* — Saliwanchik, Lloyd & Eisenschenk

(57) ABSTRACT

A lens moving apparatus is disclosed. The lens moving apparatus includes a cover member, a housing disposed in the cover member, a bobbin disposed in the housing, the bobbin being provided in an inner circumferential surface thereof with a screw thread, the bobbin being configured to move in a first direction, which is parallel to an optical-axis direction, a first coil provided on an outer circumferential surface of the bobbin, a first magnet coupled to the housing so as to be opposite the first coil, an upper elastic member provided at an upper surface of the bobbin, the upper elastic member being coupled to the bobbin and the housing, a lower elastic member provided at a lower surface of the bobbin, the lower elastic member being coupled to the bobbin and the housing, a circuit member comprising a second coil disposed under the housing so as to be opposite the first magnet, a circuit board disposed at a lower side of the circuit member, the circuit board being connected to the circuit member, a plurality of support members connected to the upper elastic member, and a base disposed under the circuit board, the base being coupled to the cover member.

22 Claims, 22 Drawing Sheets

(51) Int. Cl.
*G02B 7/02* (2021.01)
*H02K 41/035* (2006.01)
*H04N 5/225* (2006.01)
*H02K 11/33* (2016.01)
*G02B 27/64* (2006.01)
*H02K 7/14* (2006.01)

(52) U.S. Cl.
CPC ......... *H02K 11/33* (2016.01); *H02K 41/0356* (2013.01); *H04N 5/2253* (2013.01); *H04N 5/2254* (2013.01); *H04N 5/23293* (2013.01); *H04N 5/232933* (2018.08); *H02K 2213/03* (2013.01)

(56) References Cited

U.S. PATENT DOCUMENTS

| | | | | |
|---|---|---|---|---|
| 9,547,148 | B2* | 1/2017 | Hagiwara | G02B 7/09 |
| 2015/0177478 | A1* | 6/2015 | Hagiwara | G02B 7/09 |
| | | | | 359/824 |
| 2015/0212291 | A1* | 7/2015 | Lee | G02B 7/08 |
| | | | | 348/360 |
| 2015/0323758 | A1* | 11/2015 | Lee | G03B 3/10 |
| | | | | 359/824 |

FOREIGN PATENT DOCUMENTS

| | | |
|---|---|---|
| CN | 105372785 A | 3/2016 |
| CN | 105607215 A | 5/2016 |

* cited by examiner

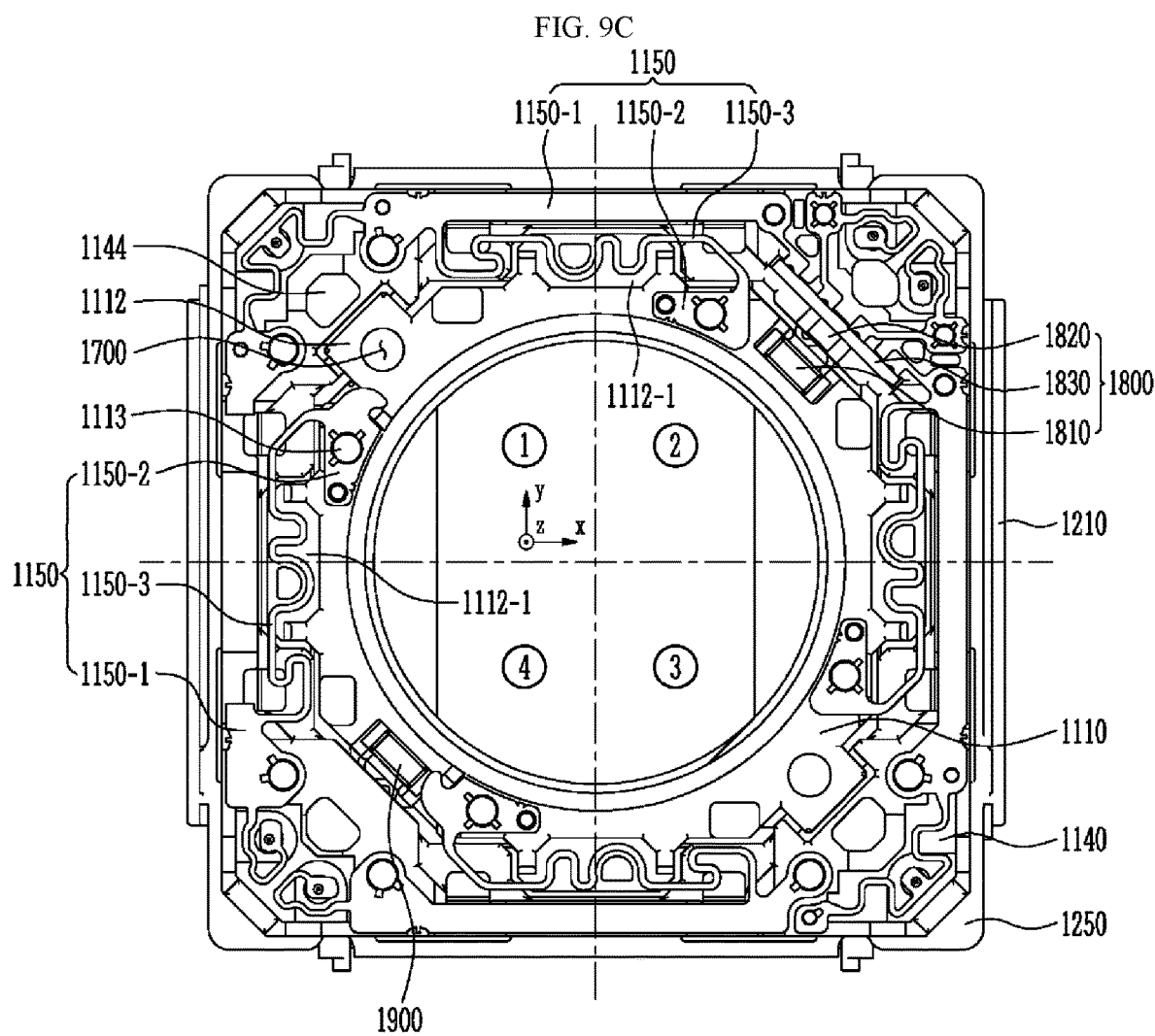

LENS MOVING APPARATUS, AND CAMERA MODULE AND PORTABLE DEVICE INCLUDING THE SAME

CROSS REFERENCE TO RELATED APPLICATION

This application claims priority to and the benefit of Korea Application Nos. 10-2016-0138204, filed on Oct. 24, 2016; and 10-2016-0138205, filed on Oct. 24, 2016, the disclosures of each of which is incorporated herein by reference in its entirety.

TECHNICAL FIELD

Embodiments relate to a lens moving apparatus, and a camera module and a portable device including the same.

BACKGROUND

Mobile phones or smartphones that are equipped with a camera module for photographing a subject and storing the photographed subject as an image or a motion picture have been developed. In general, a camera module may include a lens, an image sensor module, and a lens moving apparatus for adjusting the distance between the lens and the image sensor module.

Portable devices, such as mobile phones, smartphones, tablet PCs, and laptop computers, are equipped with a subminiature camera module. A lens moving apparatus is capable of adjusting the distance between an image sensor (not shown) and a lens to set the focal distance of the lens (auto focusing).

For example, the image sensor may be mounted on a board, which is disposed under the lens moving apparatus, so as to be opposite the lens in an optical-axis direction.

In addition, the camera module may shake minutely due to the shaking of a user's hand while photographing a subject. Lens moving apparatuses having an optical image stabilization (OIS) function for correcting the distortion of an image or a moving picture due to the shaking of a user's hand have been developed.

SUMMARY

Embodiments provide a lens moving apparatus having a structure capable of preventing parts from being deformed or damaged during assembly thereof and a camera module and a portable device including the same.

In one embodiment, a lens moving apparatus includes a cover member, a housing disposed in the cover member, a bobbin disposed in the housing, the bobbin being provided in an inner circumferential surface thereof with a screw thread, the bobbin being configured to move in a first direction, which is parallel to an optical-axis direction, a first coil provided on an outer circumferential surface of the bobbin, a first magnet coupled to the housing so as to be opposite the first coil, an upper elastic member provided at an upper surface of the bobbin, the upper elastic member being coupled to the bobbin and the housing, a lower elastic member provided at a lower surface of the bobbin, the lower elastic member being coupled to the bobbin and the housing, a circuit member comprising a second coil disposed under the housing so as to be opposite the first magnet, a circuit board disposed at a lower side of the circuit member, the circuit board being connected to the circuit member, a plurality of support members connected to the upper elastic member, and a base disposed under the circuit board, the base being coupled to the cover member, wherein the upper surface the bobbin comprises a protrusion coupled to the upper elastic member and a recess spaced apart from the protrusion, wherein the recess of the bobbin comprises two recesses disposed so as to be symmetrical with respect to an optical axis, and wherein the cover member comprises a recess disposed at position corresponding to the recess of the bobbin.

In another embodiment, a lens moving apparatus includes a bobbin configured to move in a first direction, a first coil provided on the outer circumferential surface of the bobbin, a housing having the bobbin provided therein, a first magnet coupled to the housing, an upper elastic member provided at the upper side of the bobbin, the upper elastic member being coupled to the bobbin and the housing, a lower elastic member provided at the lower side of the bobbin, the lower elastic member being coupled to the bobbin and the housing, a circuit member including a second coil disposed at the lower side of the housing so as to be opposite the first magnet, a printed circuit board disposed at the lower side of the circuit member, the printed circuit board being connected to the circuit member, and a base disposed at the lower side of the printed circuit board, wherein the bobbin is provided at a part thereof to which a lens barrel is bonded with an edge region for increasing the area of an adhesive that is applied.

In another embodiment, a camera module includes a lens, an image sensor provided so as to be opposite the lens in a first direction, and the lens moving apparatus.

In a further embodiment, a portable device includes a display panel including a plurality of pixels, the colors of which are changed according to an electrical signal, the camera module for converting an image incident through a lens into an electrical signal, and a controller for controlling the operation of the display panel and the camera module.

BRIEF DESCRIPTION OF THE DRAWINGS

Arrangements and embodiments may be described in detail with reference to the following drawings in which like reference numerals refer to like elements and wherein:

FIG. 9C is a view showing another embodiment of FIG. 9B;

DESCRIPTION OF SPECIFIC EMBODIMENTS

Figure 1:
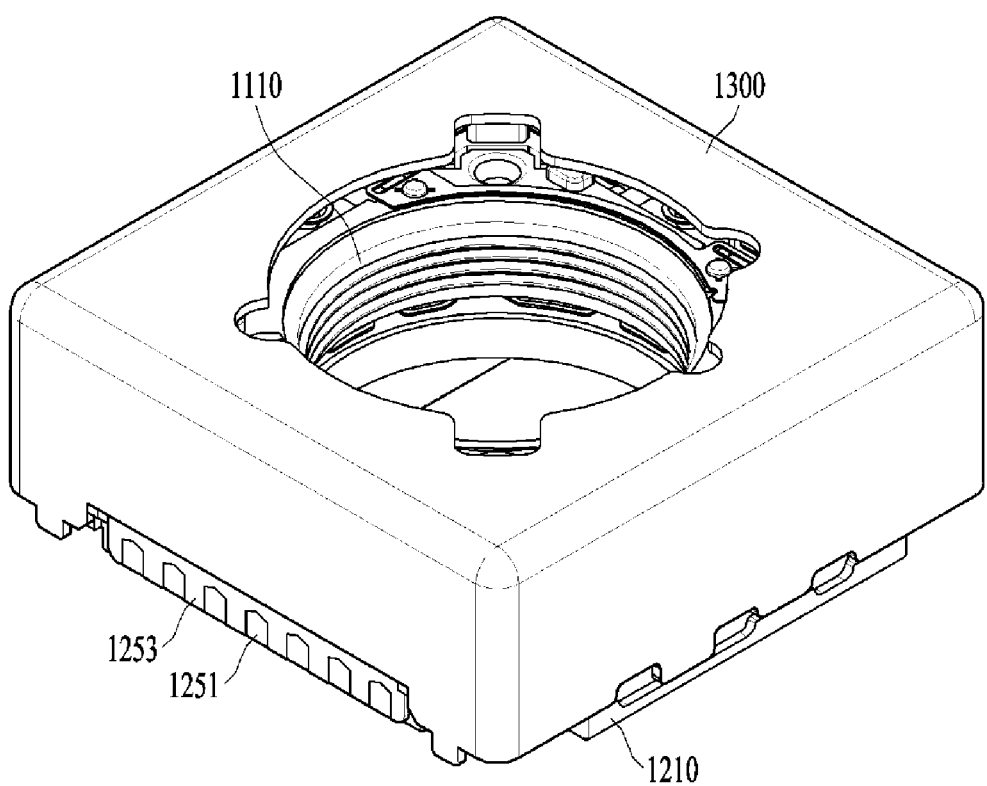
FIG. 1 is a perspective view schematically showing a lens moving apparatus according to an embodiment.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Figure 2:
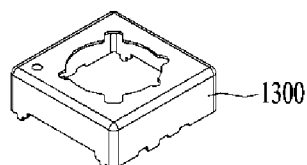
FIG. 2 is an exploded perspective view showing the lens moving apparatus according to the embodiment.
Figure 2:
Figure 2:
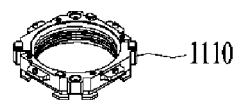
Figure 2:
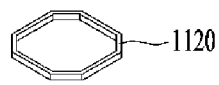
Figure 2:
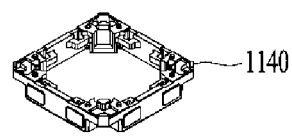
Figure 2:
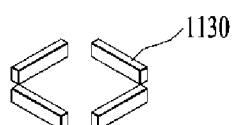
Figure 2:
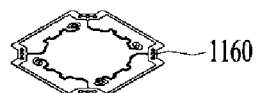
Figure 2:
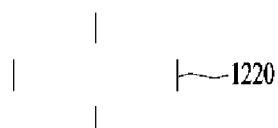
Figure 2:
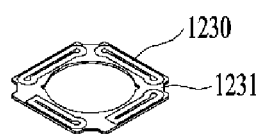
Figure 2:
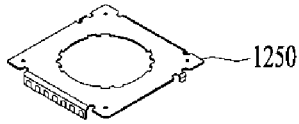
Figure 2:
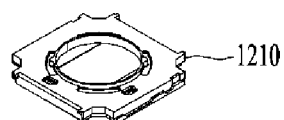

FIG. 1 is a perspective view schematically showing a lens moving apparatus according to an embodiment. FIG. 2 is an exploded perspective view showing the lens moving apparatus according to the embodiment.

An auto-focusing apparatus applied to a small-sized camera module in a mobile device, such as a smartphone or a tablet PC, is an apparatus that automatically focuses an image of a subject on the surface of an image sensor (not shown). The auto-focusing apparatus may be variously configured. In this embodiment, an optical module, including a plurality of lenses, may be moved in the first direction in order to perform an auto-focusing operation.

As shown in FIG. 2, the lens moving apparatus according to the embodiment may include a moving unit and a stationary unit. The moving unit may perform an auto-focusing function.

The moving unit may include a bobbin 1110 and a first coil 1120. The stationary unit may include a first magnet 1130, a housing 1140, an upper elastic member 1150, and a lower elastic member 1160.

The bobbin 1110 may be mounted in the housing 1140 so as to move in an optical-axis direction or in the first direction, which is parallel to the optical-axis direction. The first coil 1120, which is disposed in the first magnet 1130, may be provided on the outer circumferential surface of the bobbin 1110. The bobbin 1110 may be mounted in the housing 1140 so as to reciprocate in the first direction through electromagnetic interaction between the first magnet 1130 and the first coil 1120. The first coil 1120 may be provided on the outer circumferential surface of the bobbin 1110 so as to electromagnetically interact with the first magnet 1130.

In addition, the bobbin 1110 may move in the first direction in order to perform the auto-focusing function while being elastically supported by the upper and lower elastic members 1150 and 1160.

The bobbin 1110 may include a lens barrel LB2 (see FIG. 8A), in which at least one lens is mounted. The lens barrel LB2 may be coupled in the bobbin 1110 in various manners.

For example, a female screw thread may be formed in the inner circumferential surface of the bobbin 1110, and a male screw thread corresponding to the female screw thread may be formed in the outer circumferential surface of the lens barrel LB2 such that the lens barrel LB2 is coupled to the bobbin 1110 by screw engagement.

However, the disclosure is not limited thereto. No screw thread may be formed in the inner circumferential surface of the bobbin 1110, in which case the lens barrel LB2 may be directly fixed to the inside of the bobbin 1110 using a method other than screw engagement.

Alternatively, one or more lenses may be integrally formed with the bobbin 1110 without the lens barrel LB2. In this embodiment, however, the bobbin 1110 and the lens barrel LB2 are coupled by screw engagement. In this embodiment, therefore, a screw thread may be formed in the inner circumferential surface of the bobbin 1110 such that the lens barrel LB2 is coupled to the bobbin 1110 by screw engagement.

One lens may be coupled to the lens barrel LB2, or two or more lenses may be provided in order to constitute an optical system.

The auto-focusing function may be controlled by varying the direction of current and/or the amount of current. The bobbin 1110 may move in the first direction in order to perform the auto-focusing function.

For example, when forward current is supplied, the bobbin 1110 may move upward from the initial position thereof. When reverse current is supplied, the bobbin 1110 may move downward from the initial position thereof. Alternatively, the amount of current in one direction may be adjusted to increase or decrease the movement distance of the bobbin 1110 in the direction from the initial position thereof.

The bobbin 1110 may be provided on the upper surface and the lower surface thereof with a plurality of upper support protrusions and a plurality of lower support protrusions, respectively. The upper support protrusions may be formed in a cylindrical shape or in a prism shape. The upper support protrusions may be coupled and fixed to the upper elastic member 1150 in order to guide the upper elastic member 1150.

The lower support protrusions may be formed in a cylindrical shape or in a prism shape, in the same manner as the upper support protrusions. The lower support protrusions may be coupled and fixed to the lower elastic member 1160 in order to guide the lower elastic member 1160.

The upper elastic member 1150 may be provided at the upper side of the bobbin 1110, and the lower elastic member 1160 may be provided at the lower side of the bobbin 1110. The upper elastic member 1150 and the lower elastic member 1160 may be coupled to the bobbin 1110 and the housing 1140, respectively. The upper elastic member 1150 may be provided with through holes and/or recesses corresponding to the upper support protrusions, and the lower elastic member 1160 may be provided with through holes and/or recesses corresponding to the lower support protrusions.

The support protrusions may be fixedly coupled to the through holes and/or the recesses by thermal fusion or using an adhesive member, such as epoxy.

The housing 1140 may be formed in the shape of a hollow pillar for supporting the first magnet 1130. The housing 1140 may have an approximately quadrangular shape, and may be disposed in a cover member 1300. The first magnet 1130 may be coupled to the side surface of the housing 1140.

In addition, as described above, the bobbin 1110, which is guided by the upper and lower elastic members 1150 and 1160 so as to move in the first direction, may be mounted in the housing 1140.

In this embodiment, the first magnet 1130 may have a bar shape, and may be coupled to or disposed at the side of the housing 1140. In another embodiment, the first magnet 1130 may have a trapezoidal shape, and may be coupled to or disposed at the corner of the housing 1140.

Meanwhile, a single first magnet 1130 may be provided, or two or more first magnets 1130 may be provided. In addition, a plurality of first magnets may be arranged in the first direction so as to have a multi-layered structure.

The upper elastic member 1150 and the lower elastic member 1160 may elastically support the upward and/or downward movement of the bobbin 1110 in the first direction. Each of the upper elastic member 1150 and the lower elastic member 1160 may be, for example, a leaf spring.

As shown in FIG. 2, the upper elastic member 1150 may be divided into two parts. Consequently, currents having different polarities and different powers may be supplied to the divided parts of the upper elastic member 1150, or may be transmitted through the divided parts of the upper elastic member 1150.

In a modification, the lower elastic member 1160 may be divided into two parts, and the upper elastic member 1150 may have a single structure.

Meanwhile, the upper elastic member 1150, the lower elastic member 1160, the bobbin 1110, and the housing 1140 may be assembled by thermal fusion and/or bonding using an adhesive. At this time, thermal fusion may be performed, and then bonding using the adhesive may be performed.

A base 1210 may be disposed at the lower side of the bobbin 1110 and a printed circuit board 1250, and may have an approximately quadrangular shape. The printed circuit board 1250 may be located on the base 1210. The base 1210 may be provided in the surface thereof that faces the part of the printed circuit board 1250 at which a terminal surface 1253 is formed with a support recess having a size corresponding to the size of the part of the printed circuit board 1250 at which the terminal surface 1253 is formed. In addition, the base 1210 may be disposed at the lower side of the housing 1140 so as to be coupled to the cover member 1300.

The support recess may be formed inward from the outer circumferential surface of the base 1210 by a predetermined depth in order to prevent the part of the printed circuit board 1250 at which the terminal surface 1253 is formed from protruding outward or to adjust the extent of protrusion of the part of the printed circuit board 1250 at which the terminal surface 1253 is formed.

A support member 1220 may be disposed at the corner of the housing 1140. The upper side of the support member 1220 may be coupled and connected to the upper elastic member 1150, and the lower side of the support member 1220 may be coupled to the base 1210 and to a board including the printed circuit board 1250 and a circuit member 1231. The support member 1220 may support the bobbin 1110 and the housing 1140 such that the bobbin 1110 and the housing 1140 can move in the second direction and/or the third direction, which are perpendicular to the first direction. In addition, the support member 1220 may be connected to the first coil 1120.

The support member 1220 may be disposed at the corner of the housing 1140 so as to elastically support the housing 1140. A plurality of support members 1220 may be provided. In this embodiment, four support members 1220 may be disposed at respective corners of the housing 1140. The support member 1220 may be made of an elastic material such that the bobbin 1110 and the housing 1140 can move in the x-y plane.

In another embodiment, six support members may be provided such that two support members are disposed at each of two corners and one support member is disposed at each of the remaining two corners. Depending on the circumstances, a total of seven or more support members may be provided.

In addition, the support member 1220 may be connected to the upper elastic member 1150. For example, the support member 1220 may be connected to the part of the upper elastic member 1150 in which the through holes are formed.

In addition, since the support member 1220 is formed separately from the upper elastic member 1150, the support member 1220 may be connected to the upper elastic member 1150 by a conductive adhesive, soldering, or welding. Consequently, the upper elastic member 1150 may supply current to the first coil 1120 via the support member 1220.

The lower part of the support member may be inserted into a through hole formed in the board including the circuit member 1231 and the printed circuit board 1250 and may be coupled to the board by soldering. That is, the lower part of the support member 1220 may be inserted into and soldered to the through hole formed in the circuit member 1231 and/or the printed circuit board 1250, whereby the support member 1220 may be connected to the board.

Alternatively, no through hole may be formed in the circuit member 1231 and/or in the printed circuit board 1250, and the support member 1220 may be soldered to a corresponding part of the circuit member 1231.

In FIG. 2, a linear support member 1220 is shown as an embodiment. However, the disclosure is not limited thereto. For example, the support member 1220 may be formed in the shape of a sheet member.

The second coil 1230 may move the housing 1140 in the second direction and/or the third direction through electromagnetic interaction with the first magnet 1130, and the support member 1220 may be elastically deformed, whereby optical image stabilization may be performed.

Here, the second and third directions may include directions that are substantially close to the x-axis direction (or the first direction) and the y-axis direction (or the second direction), in addition to the x-axis direction and the y-axis direction. That is, in this embodiment, the housing 1140 may move parallel to the x-axis and the y-axis. In addition, when the housing 1140 moves while being supported by the support member 1220, the housing 1140 may move in the state of being slightly inclined relative to the x-axis and the y-axis.

Consequently, it is necessary to mount the first magnet 1130 to a position corresponding to the second coil 1230.

The second coil 1230 may be disposed so as to be opposite the first magnet 1130 fixed to the housing 1140. In an embodiment, the second coil 1230 may be disposed outside the first magnet 1130. Alternatively, the second coil 1230 may be disposed at the lower side of the first magnet 1130 so as to be spaced apart from the first magnet 1130 by a predetermined distance. Alternatively, the second coil 1230 may be disposed at the lower side of the housing 1140 so as to be opposite the first magnet 1130.

In this embodiment, four second coils 1230 may be disposed at four sides of the circuit member 1231. However, the disclosure is not limited thereto. Only one second coil may be provided for the second direction, and only one second coil may be provided for the third direction. Alternatively, more than four second coils may be provided.

Alternatively, one second coil may be provided at the first side for the second direction, two second coils may be provided at the second side for the second direction, one second coil may be provided at the third side for the third direction, and two second coils may be provided at the fourth side for the third direction. That is, a total of six second coils may be provided. In this case, the first side and the fourth side may be adjacent to each other, and the second side and the third side may be adjacent to each other.

In this embodiment, a circuit pattern corresponding to the shape of the second coil 1230 may be formed on the circuit member 1231. Alternatively, a separate second coil may be disposed on the circuit member 1231. However, the disclosure is not limited thereto. A circuit pattern corresponding to the shape of the second coil 1230 may be directly formed on the circuit member 1231.

Alternatively, a wire is wound in the shape of a doughnut in order to form the second coil 1230. Alternatively, the second coil 1230 may be formed in the shape of an FP coil, which may be connected to the printed circuit board 1250.

The circuit member 1231 including the second coil 1230 may be mounted or disposed at the upper surface of the printed circuit board 1250, which is disposed at the upper side of the base 1210. However, the disclosure is not limited thereto. The second coil 1230 may be in tight contact with the base 1210, or may be spaced apart from the base 1210 by a predetermined distance. The second coil 1230 may be formed on a separate board, which may be stacked on and connected to the printed circuit board 1250.

The board may be disposed between the housing 1140 and the base 1210, and may include the circuit member 1231 and the printed circuit board 1250. The circuit member 1231 and the printed circuit board 1250 may be connected to each other.

The circuit member 1231 may be provided with the second coil 1230, which is disposed so as to be opposite the first magnet 1130. The circuit member 1231 may be disposed at the upper side of the printed circuit board 1250.

The printed circuit board 1250 may be disposed at the lower side of the circuit member 1231, may be connected to at least one of the upper and lower elastic members 1150 and 1160, and may be coupled to the upper surface of the base 1210. The printed circuit board 1250 may be provided at a position thereof corresponding to the end of the support member 1220 with a through hole, into which the support member 1220 is inserted. Alternatively, no through hole may be formed, and the printed circuit board may be connected or bonded to the support member.

In another embodiment, when the support member 1220 is coupled to the circuit member 1231, the printed circuit board 1250 may be provided at the corner thereof corresponding to the support member 1220 with an escape portion for easy coupling, such as soldering, between the support member 1220 and the circuit member 1231.

The printed circuit board 1250 may be coupled to the upper surface of the base 1210, may be disposed at the lower side of the circuit member 1231, and may be connected to the circuit member 1231. The printed circuit board 1250 may be provided with a terminal surface 1253, which is disposed at the side surface of the base 1210 and on which a terminal 1251 is disposed. In this embodiment, the printed circuit board 1250 has two bent terminal surfaces 1253.

A plurality of terminals 1251 may be disposed on the terminal surface 1253 in order to supply current from an external power source to the first coil 1120 and the second coil 1230. The number of terminals 1251 formed on the terminal surface 1253 may be changed depending on the kind of components to be controlled. In addition, the printed circuit board 1250 may have one terminal surface 1253. Alternatively, the printed circuit board 1250 may have two or more terminal surfaces 1253.

The cover member 1300 may be formed in the shape of a box having corners. The cover member 1300 may receive the moving unit, the second coil 1230, and a portion or the entirety of the printed circuit board 1250, and may be coupled to the base 1210. The cover member 1300 protects the moving unit, the second coil 1230, and the printed circuit board 1250 received therein so as to protect the same from damage.

In addition, the cover member 1300 may prevent an electromagnetic field generated by the first magnet 1130, the first coil 1120, and the second coil 1230 received therein from leaking to the outside in order to condense the electromagnetic field.

Figure 3:
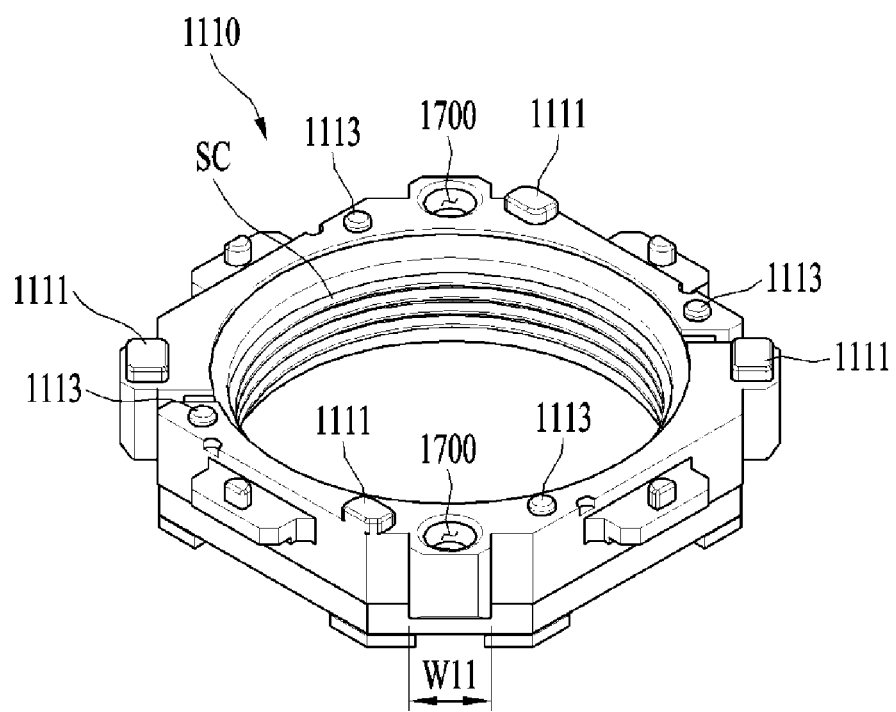
FIG. 3 is a perspective view showing a bobbin according to an embodiment.

Hereinafter, the structures of the bobbin 1110 and the housing 1140 will be described in more detail with reference to FIGS. 3 and 4. FIG. 3 is a perspective view showing a bobbin 1110 according to an embodiment.

The bobbin 1110 may include a protrusion 1113 and a third projecting part 1111. The protrusion 1113 is a portion that is coupled into the through hole formed in the upper elastic member 1150. The protrusion 1113 may be formed in a cylindrical shape or any of various other shapes. The protrusion 1113 may guide the upper elastic member 1150 such that the upper elastic member 1150 is coupled to the bobbin 1110. The length of the protrusion 1113 in the first direction may be, for example, 0.2 to 0.3 mm.

The third projecting part 1111 may be formed on the upper surface of the bobbin 1110. When external impact is applied, the upper surface of the third projecting part 1111 may collide with the lower surface of the cover member 1300 in order to prevent plastic deformation exceeding the elastic limit of a spring.

In the case in which the initial position of the bobbin 1110 is set to the position at which the bobbin 1110 cannot move downward any further, auto-focusing of the bobbin 1110 may be controlled in one direction. That is, the bobbin 1110 moves upward when the amount of current that is supplied to the first coil 1120 increases, and the bobbin 1110 moves downward to the initial position thereof when the amount of current that is supplied to the first coil 1120 decreases, whereby the auto-focusing function may be performed.

However, in the case in which the initial position of the bobbin 1110 is set to provide a distance by which the bobbin 1110 can move downward, the auto-focusing of the bobbin 1110 may be controlled in opposite directions. That is, the bobbin 1110 may move upward or downward in the first direction, whereby the auto-focusing function may be performed.

For example, when forward current is supplied, the bobbin 1110 may move upward. When reverse current is supplied, the bobbin 1110 may move downward.

Figure 4:
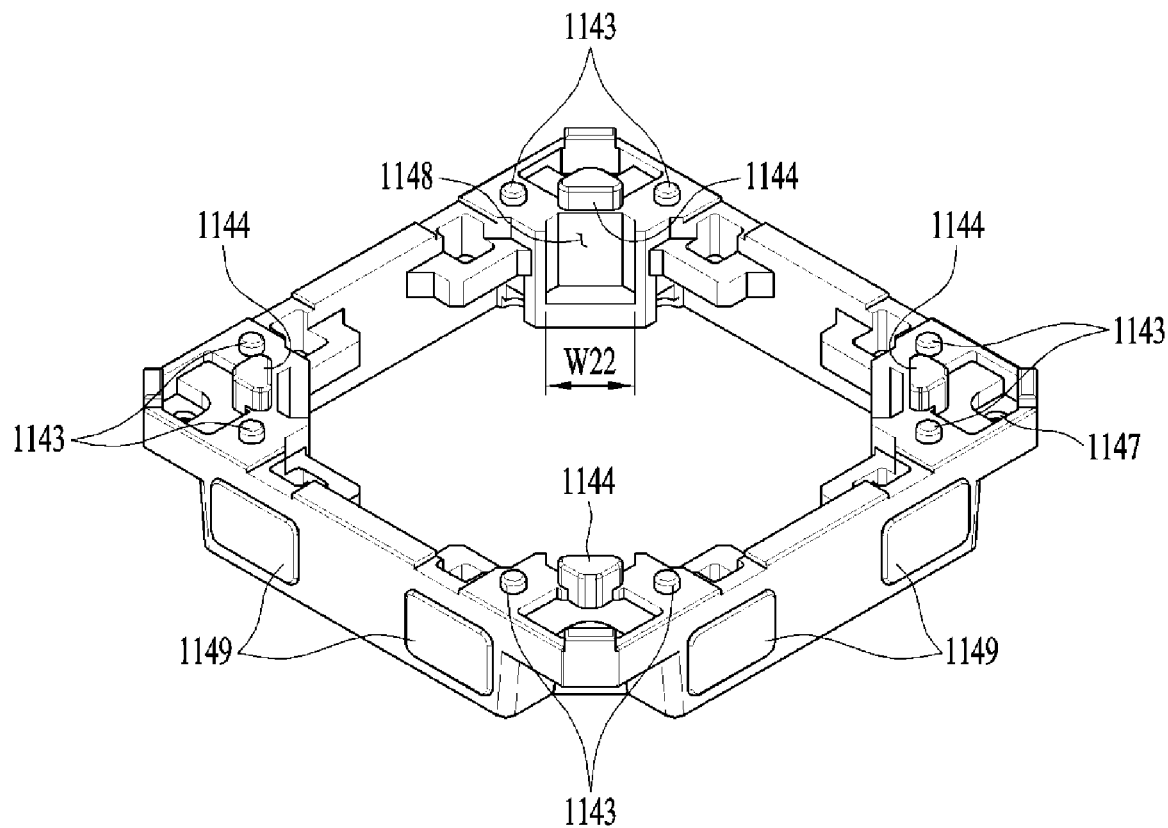
FIG. 4 is a perspective view showing a housing according to an embodiment.

FIG. 4 is a perspective view showing a housing 1140 according to an embodiment. The housing 1140 may support the magnet 1130, and may receive therein the first bobbin 1110, which moves in the first direction.

The housing 1140 may be generally formed in the shape of a hollow pillar. For example, the housing 1140 may have a polygonal hollow part (e.g. a quadrangular or octagonal hollow part) or a circular hollow part.

The housing 1140 may include a second upper support protrusion 1143 and a fourth projecting part 1144. The second upper support protrusion 1143 is a portion that is coupled into the through hole formed in the upper elastic member 1150.

The second upper support protrusion 1143 may be formed in a cylindrical shape or any of various other shapes. The second upper support protrusion 1143 may guide the upper elastic member 1150 such that the upper elastic member 1150 is coupled to the housing 1140.

The fourth projecting part 1144 may be formed on the upper surface of the housing 1140. The fourth projecting part 1144 may serve to stop the cover member 1300 and the housing 1140. That is, when external impact is applied, the upper surface of the fourth projecting part 1144 may collide with the lower surface of the cover member 1300 in order to prevent the cover member 1300 and the housing 1140 from directly colliding with each other.

The bobbin 1110 may have a plurality of projecting regions, each of which projects from the side surface thereof and has a predetermined width. Hereinafter, the predetermined width of each of the projecting regions will be referred to as a first width W11 (see FIG. 3). As will be described below, the projecting regions may be first stoppers 1112.

The housing 1140 may be provided with a plurality of recessed regions at positions thereof corresponding to the projecting regions of the bobbin 1110. Hereinafter, the recessed regions will be referred to as third recessed parts 1148.

The surface of each third recessed part 1148 in the housing 1140 opposite the bobbin 1110 may have a shape that corresponds to a corresponding one of the projecting regions of the bobbin 1110. Each of the first width W11 of the bobbin 1110 shown in FIG. 3 and a second width W22 of each third recessed part 1148 in the housing 1140 shown in FIG. 4 may have a predetermined tolerance. Here, the second width W22 is a predetermined width of each third recessed part 1148.

Since the third recessed part 1148 is disposed so as to corresponding to the first width W11 of the bobbin 1110, the bobbin 1110 may be prevented from rotating relative to the housing 1140. Even when force for rotating the bobbin 1110 about an optical axis or an axis parallel to the optical axis is applied to the bobbin 1110, therefore, the third recessed part 1148 in the housing 1140 may prevent the rotation of the bobbin 1110.

In addition, the housing 1140 may be provided in the corner thereof with a second through-hole 1147. The support member 1220 may extend through the second through-hole 1147 in the first direction so as to be connected to the upper elastic member 1150.

In this embodiment, four support members 1220 are disposed at respective corners of the housing 1140. Consequently, a number of second through-holes 1147 equal to the number of support members 1220, i.e. four second through-holes 1147, may also be provided at positions corresponding to the support members 1220. Of course, when the number of support members 1220 is changed, the number of second through-holes 1147 may be changed.

In another embodiment, recessed parts, through which the support members 1220 extend, may be formed in the corners of the housing 1140, instead of the second through-holes 1147. In the same manner as described above, the number of recessed parts may be changed depending on the number of support members 1220.

Meanwhile, the housing 1140 may be provided at the lower surface of each corner thereof with a lower support protrusion (not shown) for coupling with the lower elastic member 1160. The lower support protrusion may be provided at a position corresponding to the upper support protrusion while having a shape corresponding to the shape of the upper support protrusion. However, the disclosure is not limited thereto.

The housing 1140 may be provided with a plurality of third stoppers 1149 protruding from the respective sides thereof. The third stoppers 1149 may serve to prevent the housing 1140 from colliding with the cover member 1300 when the housing 1140 moves in the second and third directions.

Figure 5:
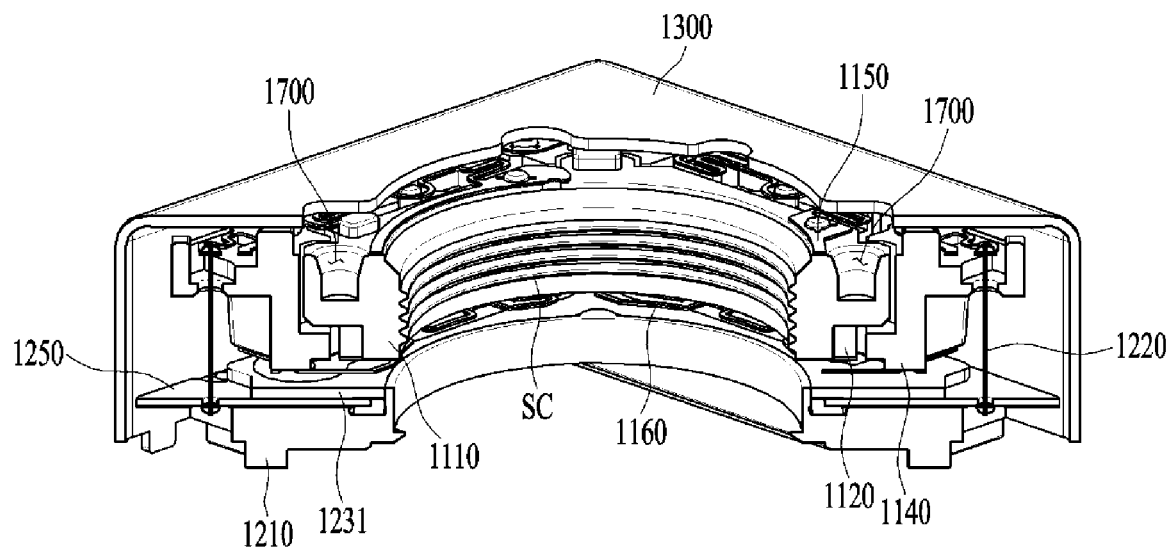
FIG. 5 is a sectional perspective view showing a lens moving apparatus according to another embodiment.
Figure 6:
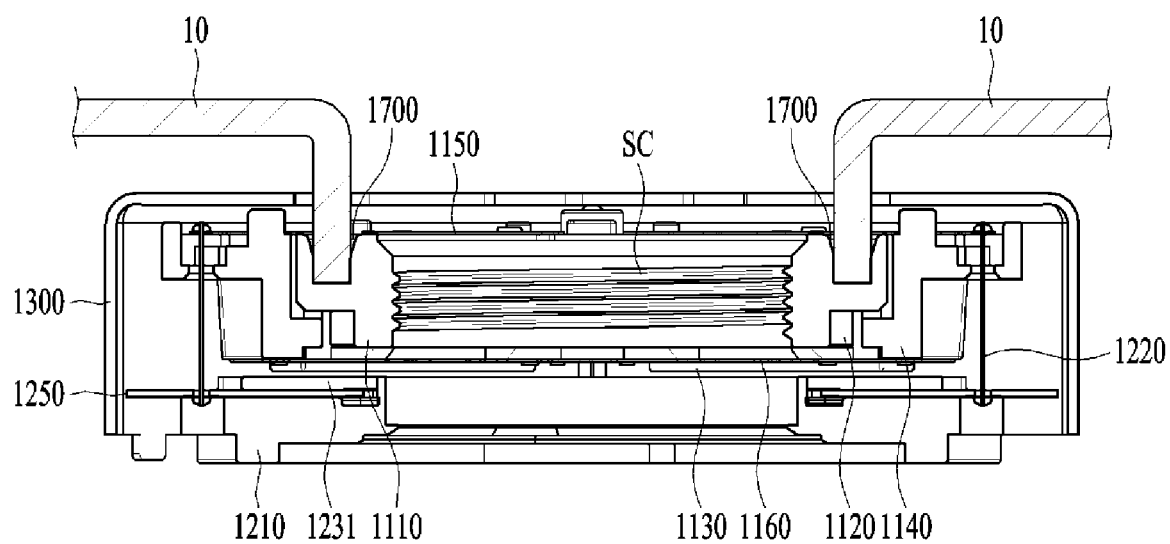
FIG. 6 is a front view of FIG. 5.

FIG. 5 is a sectional perspective view showing a lens moving apparatus according to another embodiment. FIG. 6 is a front view of FIG. 5. In this embodiment, as shown in FIGS. 5 and 6, the bobbin 1110 may be provided with a recess 1700.

When components of the lens moving apparatus according to the embodiment are assembled, an assembly apparatus may be coupled into the recess 1700 in order to easily perform the assembly operation.

In another embodiment, although not shown, the recess may also be formed in the housing 1140. The assembly apparatus may be coupled into the recess formed in the housing 1140, in the same manner as the recess 1700 formed in the bobbin 1110.

Since the recess is formed in the housing 1140 or the bobbin 1110, the operation of assembling the lens moving apparatus may be easily performed, and damage to the lens moving apparatus which may be caused during the assembly operation may be effectively prevented.

For example, when the lens barrel LB2 is coupled to the bobbin 1110, a rotation preventing means 10 for preventing the bobbin 1110 from rotating relative to the lens barrel LB2 may be coupled into the recess 1700.

In the lens moving apparatus according to the embodiment, the lens barrel LB2 may be coupled to the bobbin 1110 by screw engagement. That is, the bobbin 1110 may be provided in the inner circumferential surface thereof with a screw thread SC, with which the lens barrel LB2 engages, and the lens barrel LB2 may be provided in the outer circumferential surface thereof with a screw thread that engages with the screw thread SC formed in the bobbin 1110.

The lens barrel LB2 may be rotated in order to couple the lens barrel LB2 to the screw thread SC in the bobbin 1110.

At this time, the bobbin 1110 may rotate due to frictional force generated between the lens barrel LB2 and the bobbin 1110.

When the bobbin 1110 rotates, force may be applied to the connection between the housing 1140, in which the bobbin 1110 is mounted, and the bobbin 1110. The force may cause abrasion of the bobbin 1110 and the housing 1140 or even breakage of the bobbin 1110 and the housing 1140 at the connection therebetween.

In addition, when the bobbin 1110 rotates, the housing 1140 may also rotate. When the bobbin 1110 and the housing 1140 rotate, the upper elastic member 1150, the lower elastic member 1160, and the support member 1120 coupled thereto may be deformed, which may cause the breakage or plastic deformation of the upper elastic member 1150, the lower elastic member 1160, and the support member 1120. As a result, the lens moving apparatus may be defective.

When the lens barrel LB2 is rotated so as to be coupled to the bobbin 1110 by screw engagement, therefore, it is necessary to prevent the rotation of the bobbin 1110 in order to prevent the abrasion, breakage, or deformation of the bobbin 1110, the housing 1140, the upper elastic member 1150, the lower elastic member 1160, and the support member 1120.

In order to prevent the rotation of the bobbin 1110 at the time of coupling the lens barrel LB2, a rotation preventing means 10 may be used. The rotation preventing means 10 may be, for example, a jig provided at an external apparatus for assembling the lens moving apparatus.

When the lens barrel LB2 is coupled to the bobbin 1110 in the state in which the rotation preventing means 10 holds the bobbin 1110, the rotation preventing means 10 prevents the rotation of the bobbin 1110. Even when the lens barrel LB2 is rotated so as to be coupled to the bobbin 1110 by screw engagement, therefore, the rotation of the bobbin 1110 may be prevented.

Consequently, it is necessary to configure the bobbin 1110 so as to have a structure in which the rotation preventing means 10 is coupled to the bobbin 1110 in order to hold the bobbin 1110 and in which the rotation preventing means 10 is easily separated from the bobbin 1110 after the coupling of the lens barrel LB2.

The structure in which the rotation preventing means 10 is separably coupled to the bobbin 1110 is the recess 1700 formed in the bobbin 1110. That is, when the lens barrel LB2 is rotated so as to be coupled to the bobbin 1110, the rotation preventing means 10 may be coupled into the recess 1700, whereby the rotation of the bobbin 1110 may be prevented.

As shown in FIGS. 5 and 6, the recess 1700 may be formed inward from the upper surface of the bobbin 1110. Meanwhile, two or more recesses 1700 may be provided.

If one recess 1700 is provided and the lens barrel LB2 is coupled to the bobbin 1110 in the state in which one rotation preventing means 10 is coupled into the recess 1700, the bobbin 1110 may rotated about the recess 1700.

In order to more stably and securely prevent the rotation of the bobbin 1110, therefore, two or more recesses 1700 may be provided, and two or more rotation preventing means 10 may be coupled into the recesses 1700 in order to hold the bobbin 1110.

Meanwhile, the recesses 1700 may be disposed so as to be symmetrical with respect to the center of the bobbin 1110. In order to most securely and stably prevent the rotation of the bobbin 1110, the bobbin 1110 may be held in a symmetrical fashion with respect to the center of the bobbin 1110.

In order for the rotation preventing means 10 to hold the bobbin 1110 in a symmetrical fashion with respect to the center of the bobbin 1110, therefore, the recesses 1700 may be disposed so as to be symmetrical with respect to the center of the bobbin 1110.

In addition, two recesses 1700 may be formed in the upper surface of the bobbin 1110 so as to be symmetrical with respect to the center of the bobbin 1110.

If three or more recesses 1700 are formed, the number of empty spaces in the bobbin 1110 formed by the recesses 1700 may increase, with the result that the mechanical strength of the bobbin 1110 is reduced, whereby the bobbin 1110 may be easily damaged by external impact.

In addition, since the lens moving apparatus according to the embodiment is an ultra-small apparatus, it may be difficult to secure space necessary to form a large number of recesses 1700 in the bobbin 1110.

In addition, when the lens barrel LB2 is coupled after the cover member 1300 is assembled in the lens moving apparatus according to the embodiment, the cover member 1300 must be provided at the parts thereof corresponding to the recesses 1700 with through-holes, through which the rotation preventing means 10 are inserted, or escape parts.

In this case, the size of the exposed region of the cover member 1300 may increase due to the formation of the through-holes or the escape parts.

Foreign matter may be introduced into the lens moving apparatus through the exposed region, and the introduced foreign matter may reduce the performance of the lens moving apparatus. Consequently, it may be reasonable to minimize the number of through-holes or escape parts formed in the cover member 1300.

For the above reason, it is necessary to securely and stably prevent the rotation of the bobbin 1110 and to minimize the number of recesses 1700, which may be achieved satisfied when the number of recesses is 2.

The two recesses 1700 may be disposed so as to be symmetrical with respect to the center of the bobbin 1110, for the above reason.

In this embodiment, the recesses 1700 are formed in the bobbin 1110, and the rotation preventing means 10 are coupled into the recesses 1700. When the lens barrel LB2 is rotated so as to be coupled to the bobbin 1110, therefore, it is possible to effectively prevent the rotation of the bobbin 1110 due to friction between the lens barrel LB2 and the bobbin 1110.

Since the rotation of the bobbin 1110 is prevented, it is possible to greatly reduce abrasion of the bobbin 1110 and the housing 1140 or breakage of the bobbin 1110 and the housing 1140 due to friction between the lens barrel LB2 and the bobbin 1110 at the connection therebetween.

Since the rotation of the bobbin 1110 is prevented, it is possible to effectively prevent the deformation of the upper elastic member 1150, the lower elastic member 1160, and the support member 1220 coupled to the bobbin 1110 and the housing 1140.

Meanwhile, recesses may be formed in the housing 1140 so as to have a structure similar to the structure of the recesses 1700 formed in the bobbin 1110. For example, two recesses may be formed in the housing 1140, and the recesses may be disposed so as to be symmetrical with respect to the center of the housing 1140.

However, when the assembly operation is performed in the sequence in which the housing 1140 is received in the cover member 1300 after the assembly apparatus is separated from the recesses formed in the housing 1140, it may be unnecessary to provide separate escape parts or escape recesses for separating the assembly apparatus in the housing 1140.

Figure 7:
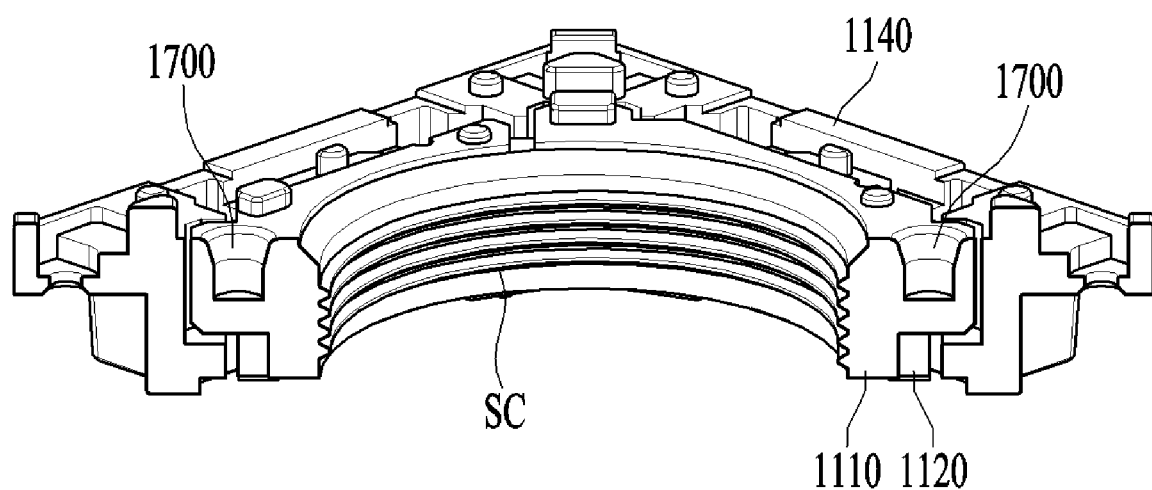
FIG. 7 is a partial sectional perspective view of FIG. 5.
Figure 8A:
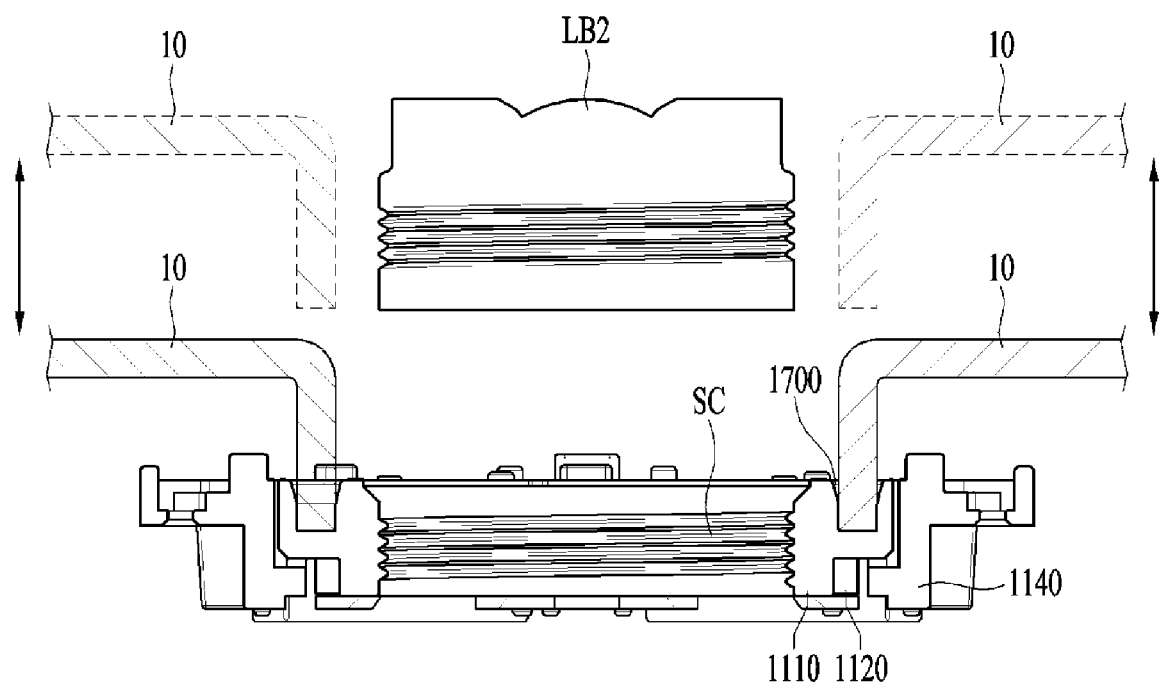
FIG. 8A is a front view of FIG. 7.

FIG. 7 is a partial sectional perspective view of FIG. 5. FIG. 8A is a front view of FIG. 7. As shown in FIGS. 7 and 8A, a plurality of recesses 1700 may be provided, and the recesses 1700 may be disposed at positions corresponding to the corners of the housing 1140 at which the support members 1220 are disposed.

When the bobbin 1110 and the housing 1140 rotate, the support members disposed at the corners of the housing 1140 may be plastically deformed.

When the lens barrel LB2 is coupled to the bobbin 1110 by screw engagement, therefore, it is necessary to more securely prevent the support members 1220 from being plastically deformed due to the rotation of the bobbin 1110.

When the bobbin 1110 and the housing 1140 rotate, the parts having the smallest rotation angle are recesses 1700, into which the rotation preventing means 10 are coupled.

In the case in which the recesses 1700 are disposed so as to be adjacent to the support members 1220, therefore, it is possible to effectively prevent plastic deformation of the support members 1220 since the rotation angle is small even when the bobbin 1110 and the housing 1140 rotate.

In order to effectively prevent plastic deformation of the support members 1220, therefore, the recesses 1700 may be disposed at positions corresponding to the corners of the housing 1140.

In other words, the housing 1140 may generally have a quadrangular shape, and the recesses 1700 may be disposed along diagonal lines that connect the corners of the housing 1140.

However, the disclosure is not limited thereto. In another embodiment, the recesses 1700 may be disposed at positions spaced apart from the diagonal line that connects the corners of the housing 1140. In this case, the recesses 1700 may be disposed at positions adjacent to the diagonal line in the radial direction of the bobbin 1110.

In the above structure, the support members 1220 and the rotation preventing means 10 may be disposed so as to be adjacent to each other, and the rotation of the bobbin 1110 and the housing 1140 may be minimized by the rotation preventing means 10, whereby plastic deformation of the support members 1220 may be effectively prevented.

The coupling of the lens barrel LB2 will be described with reference to FIG. 8A. First, the housing 1140 having the bobbin 1110 mounted therein is disposed on a worktable of a lens moving apparatus assembly apparatus (not shown).

At this time, the coupling of the lens barrel LB2 may be performed after the cover member 1300 is assembled, or the cover member 1300 may be assembled after the coupling of the lens barrel LB2 is completed.

Next, the ends of the rotation preventing means 10 are inserted into the recesses 1700 in order to hold the bobbin 1110. At this time, the rotation preventing means 10 are inserted into the recesses 1700 in the state of being spaced apart from the bobbin 1110 so as to be coupled to the bobbin 1110.

Of course, the rotation preventing means 10 serve to prevent the rotation of the bobbin 1110.

Next, the lens barrel LB2 is coupled to the screw thread SC formed in the inner circumferential surface of the bobbin 1110. At this time, the lens barrel LB2 is rotated so as to be coupled to the screw thread SC in the bobbin 1110.

At this time, the rotation preventing means 1 may prevent the rotation of the bobbin 1110 due to friction between the lens barrel LB2 and the bobbin 1110.

After the coupling between the lens barrel LB2 and the bobbin 1110 by screw engagement is completed, the rotation preventing means 10 are separated from the recesses 1700 and the bobbin 1110. As shown in FIG. 8A, therefore, the rotation preventing means 10 may be configured to move upward and downward.

Figure 8B:
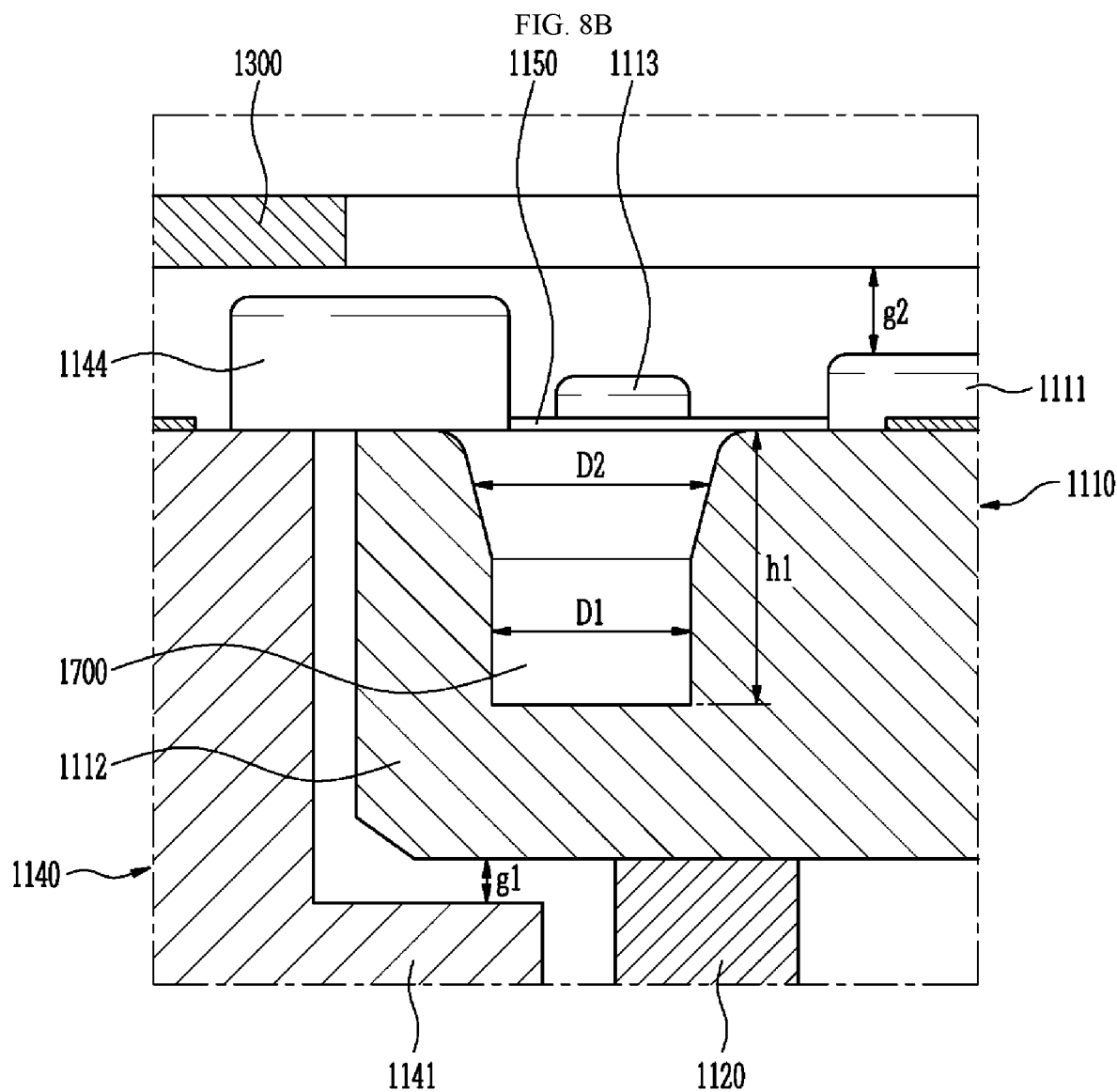
FIG. 8B is an enlarged sectional view showing a recess according to an embodiment.

FIG. 8B is an enlarged sectional view showing a recess 1700 according to an embodiment. The bobbin 1110 may include a second stopper 1141. The second stopper 1141 may protrude from the side surface of the housing 1140 so as to be opposite the lower surface of a corresponding one of the first stoppers 1112 in the first direction in order to prevent the bobbin 1110 from excessively moving downward in the first direction. That is, when the lower surface of the first stopper 1112 and the upper surface of the second stopper 1141 contact each other, the bobbin 1110 does not move downward any more.

Meanwhile, the lower surface of the first stopper 1112 and the upper surface of the second stopper 1141 may be spaced apart from each other by a first distance g1 in the first direction at an initial position of the bobbin. Here, the initial position may be a position of the bobbin 1110 in the first direction in the state in which no current is supplied to the first coil 1120.

A depth h1 of the recess 1700 may be greater than a value obtained by adding the first distance g1 to the drooping amount of the bobbin 1110 in the first direction due to the weight of the lens barrel LB2 coupled to the bobbin 1110. In other words, the depth h1 of the recess 1700 may be equal to or greater than the downward stroke length of the bobbin 1110.

In FIG. 8B, there is shown a structure in which the weight of the lens barrel LB2 coupled to the bobbin 1110 is not considered. That is, the first distance g1 may be, for example, 50 to 100 μm before the lens barrel LB2 is assembled. In another embodiment, the first distance g1 may be, for example, 50 to 100 μm even after the lens barrel LB2 is assembled.

The following equation may be valid: First distance g1 before lens barrel LB2 is assembled=first distance g1' after lens barrel LB2 is assembled+drooping amount of bobbin due to weight of lens barrel.

In addition, a second distance g2, which is a distance between the upper surface of the third projecting part 1111 and the lower surface of the cover member 1300, may be, for example, about 250 μm.

After the lens barrel LB2 is assembled to the lens moving apparatus, however, the bobbin 1110 may droop downward in the first direction due to the weight of the lens barrel LB2. Consequently, the depth h1 of the recess 1700 is set in consideration of the drooping amount of the bobbin. The drooping amount of the bobbin may be, for example, 30 to 50 μm. That is, the position of the bobbin 1110 in the lens moving apparatus before the lens barrel LB2 is assembled may be set in consideration of the drooping amount of the bobbin such that the first distance g1' is 50 to 100 μm by the drooping amount of the bobbin after the lens barrel LB2 is assembled.

Consequently, the depth h1 of the recess 1700 may be greater than the first distance g1 or g1' such that the rotation preventing means 10 is inserted into the recess 1700 in order to stably hold the bobbin 1110.

Meanwhile, the recess 1700 may be circular, and the diameter of the recess 1700 may be, for example, 0.3 to 0.6 mm. Alternatively, the diameter of the recess 1700 may be more than 0.6 mm.

In addition, the recess 1700 may be formed in a polygonal shape, such as a triangular shape, a quadrangular shape, a pentagonal shape, or a hexagonal shape. In this case, the length of each side of a polygon may be 0.3 to 0.6 mm or more than 0.6 mm.

The depth h1 of the recess 1700 may be, for example, 0.3 mm or more. The depth h1 of the recess 1700 may be 50% or more the diameter of the recess 1700. In addition, the depth h1 of the recess 1700 may be greater than the diameter of the recess 1700. An upper diameter D2 of the recess 1700 may be greater than a lower diameter D1 of the recess 1700. In this structure, the rotation preventing means 10 may be easily inserted into and separated from the recess 1700.

In addition, as shown in FIG. 8B, the diameter of the recess may gradually increase from the lower part to the upper part thereof. In this structure, the rotation preventing means 10 may be easily inserted into and separated from the recess 1700.

Figure 9A:
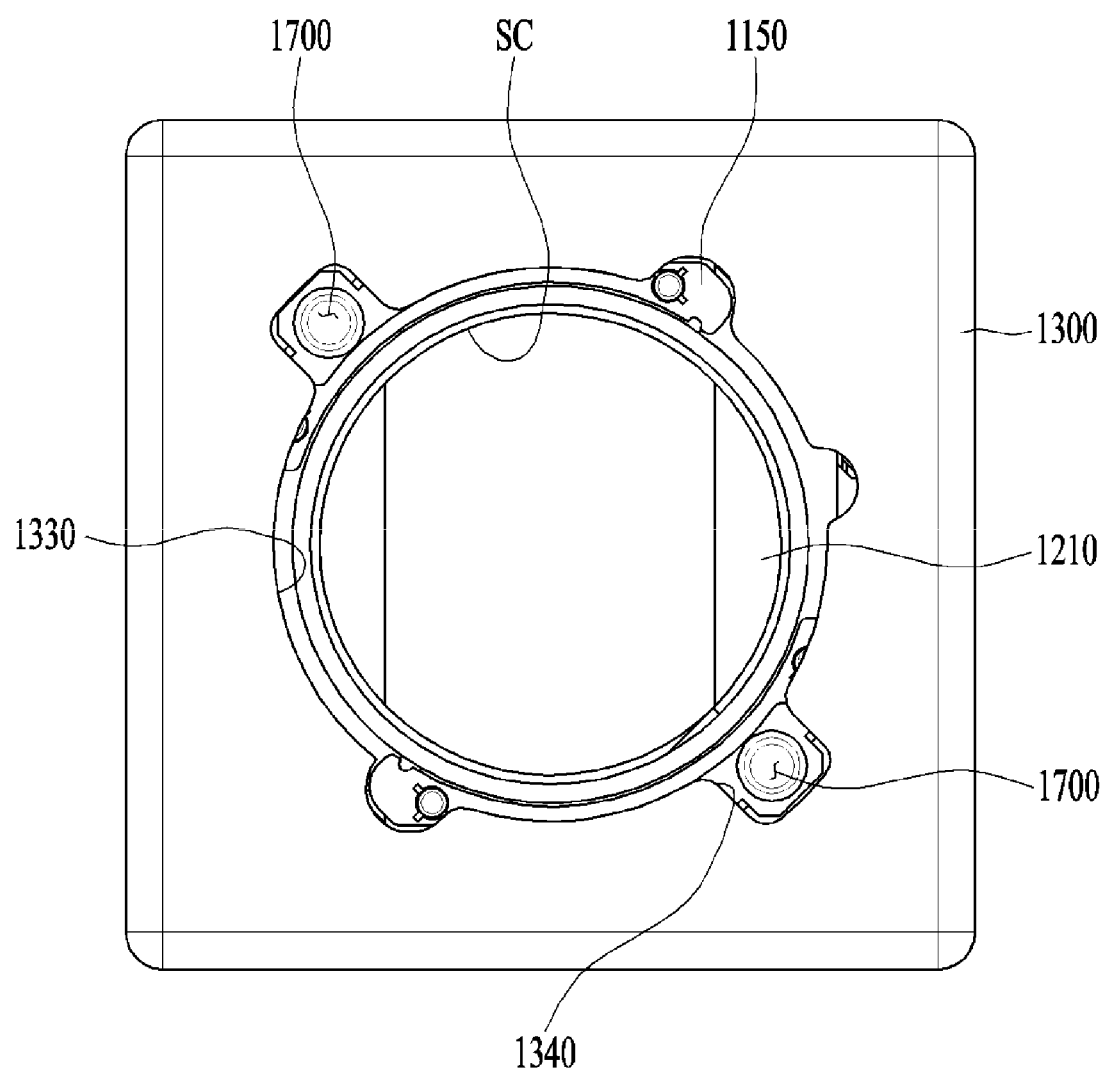
FIG. 9A is a plan view showing a lens moving apparatus according to another embodiment.

FIG. 9A is a plan view showing a lens moving apparatus according to another embodiment. The cover member 1300 may cover the bobbin 1100 while receiving the bobbin 1110. As shown in FIG. 9A, escape recesses 1340 may be formed at positions corresponding to the recesses 1700.

Specifically, the cover member may be provided with a through part 1330 corresponding to the inner circumference of the bobbin 1110, and the through part 1330 may be recessed in order to form the escape recesses 1340.

Referring to FIG. 7, the bobbin 1110 is configured to move relative to the housing 1140 in the first direction. For smooth movement of the bobbin 1110 in the first direction, therefore, it may be appropriate to reduce the sectional area of the bobbin 1110 when viewed in the first direction.

As shown in FIG. 9A, therefore, the escape recesses 1340 may be disposed so as to be adjacent to the through part 1330 formed in the center of the cover member 1300, and the escape recesses 1340, through which the rotation preventing means 10 are inserted, may be formed in the through part 1330 at positions corresponding to the recesses 1700 in the x-y plane. That is, the escape recesses 1340 may be disposed so as to overlap the recesses 1700 in the first direction.

In FIG. 9A, the escape recesses 1340 are provided so as to be symmetrical with respect to the diagonal line connecting the recesses 1700, which is one of the diagonal lines connecting the corners of the housing 1140. However, the disclosure is not limited thereto. The escape recesses 1340 may be provided in an asymmetrical fashion.

Meanwhile, foreign matter may be introduced into the lens moving apparatus through the through part 1330 including the escape recesses. In order to prevent the introduction of foreign matter, for example, an adhesive may be applied to the through part 1330.

In another embodiment, a cover (not shown) for preventing the introduction of foreign matter may be disposed in front of the lens moving apparatus.

Figure 9B:
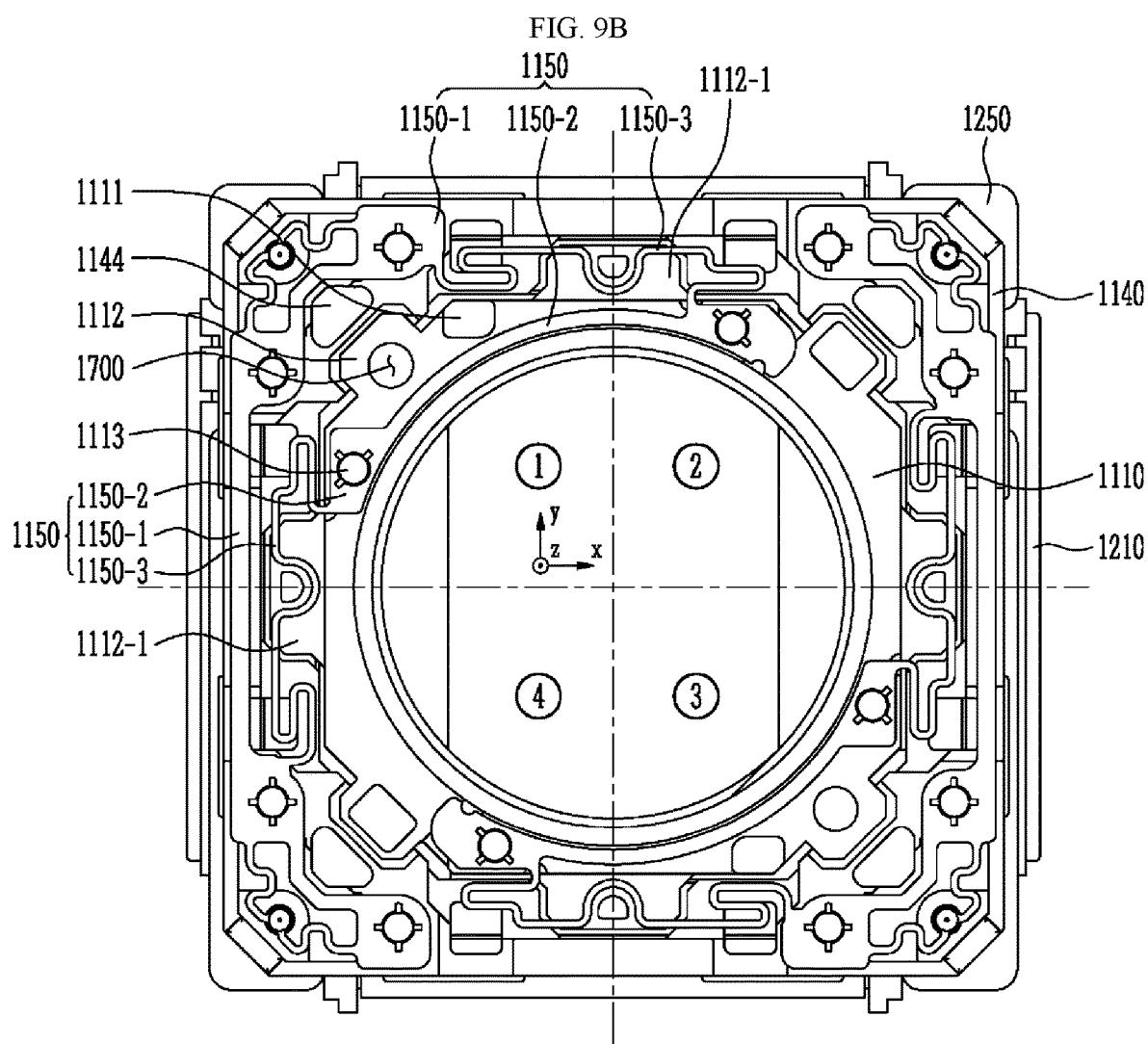
FIG. 9B is a view identical to FIG. 9A except that a cover member is removed therefrom.

FIG. 9B is a view identical to FIG. 9A except that the cover member 1300 is removed therefrom. As shown in FIG. 9B, the bobbin 1110 may include a first stopper 1112 protruding from the side surface of the bobbin 1110. The first stopper 1112 may include a projecting region that contacts the housing 1140 to prevent the rotation of the bobbin 1110 relative to the housing 1140. Here, the first stopper 1112 may be referred to as a first projecting portion.

The projecting region may be the first stopper 1112, and a recess 1700 may be formed in at least a portion of the upper surface of the first stopper 1112. In addition, at least a portion of the recess 1700 may be disposed in the first stopper 1112 or the projecting region.

The housing 1140 may have a recessed region formed at a position thereof corresponding to the first stopper 1112 while having a shape corresponding to the shape of the first stopper 1112.

The first stopper 1112 may be disposed in the recessed region to prevent the rotation of the bobbin 1110 relative to the housing 1140.

A plurality of first stoppers 1112 or projecting regions may be provided. The first stoppers 1112 may be disposed so as to be symmetrical with respect to the center of the bobbin 1110. The recesses 1700 may be formed in at least some of the first stoppers 1112 or projecting regions. One recess 1700 may be formed in each of the first stoppers 1112 or projecting regions. At least some of the recesses 1700 may be disposed in the first stoppers 1112 or projecting regions.

In the embodiment shown in FIG. 9B, two first stoppers 1112 may be disposed so as to be symmetrical with respect to the center of the bobbin 1110, and two recesses 1700 may also be disposed so as to be symmetrical with respect to the center of the bobbin 1110.

The recesses 1700 may be formed by recessing the upper surface of the bobbin 1110. The recesses 1700 may be formed over regions at which the first stoppers 1112 are formed and regions of the bobbin 1110 excluding the regions at which the first stoppers 1112 are formed. In another embodiment, in the case in which the first stoppers 1112 are large, the recesses 1700 may be formed only in the upper surfaces of the first stoppers 1112.

The recesses 1700 may be disposed at positions having sufficient space, such as corners of the housing 1140. Consequently, the first stoppers 1112 may also be disposed at the corners of the housing 1140.

The bobbin may include 1-1 projection portions 1112-1 disposed so as to be spaced apart from the first stopper 1112 in the circumferential direction, and the upper surfaces of the first stopper 1112 may be higher than the upper surfaces of the 1-1 projection portions 1112-1. The 1-1 projection portions 1112-1 may be stoppers, which may prevent the rotation of the bobbin 1110 relative to the housing 1140 together with the first stoppers 1112.

As shown in FIG. 9B, the first stoppers 1112 or the projecting regions may be disposed at corresponding corners of the housing 1140, and the 1-1 projection portions 1112-1 may be disposed at corresponding sides of the housing.

The upper elastic member 1150 may include an outer frame 1150-1 coupled to the housing 1140, an inner frame 1150-2 coupled to the bobbin 110, and a connection portion 1150-3 interconnecting the outer frame 1150-1 and the inner frame 1150-2.

The connection portion 1150-3 may be disposed at the upper side of the 1-1 projection portions 1112-1. Since the connection portion 1150-3 is elastically deformed, the connection portion 1150-3 may have sufficient space in the first direction. Consequently, the upper surfaces of the 1-1 projection portions 1112-1 may be lower than the upper surfaces of the first stoppers 1112 or the projecting regions such that space is defined above the 1-1 projection portions 1112-1 at which the connection portion 1150-3 is disposed. Consequently, the upper surfaces of the first stoppers 1112 or the projecting regions may be higher than the upper surfaces of the 1-1 projection portions 1112-1.

Meanwhile, as shown in FIG. 9B, the recess 1700 may be exposed to the outside such that the rotation preventing means 10 can be inserted into and separated from the recess 1700, and may be disposed so as not to impede the movement of the rotation preventing means 10 in the first direction.

Consequently, the outer frame 1150-1, the inner frame 1150-2, and the connection portion 1150-3 may not be disposed in the first direction of the recess 1700. For example, as shown in FIG. 9B, the recess 1700 may be disposed so as to be surrounded by the outer frame 1150-1, the inner frame 1150-2, and the connection portion 1150-3 in the x-y plane, which is perpendicular to the first direction, and so as not to overlap the outer frame 1150-1, the inner frame 1150-2, and the connection portion 1150-3 in the first direction. The recess 1700 may be disposed between the inner frame 1150-2 and the connection portion 1150-3. Alternatively, the connection portion 1150-3 and/or the outer frame 1150-1 may be disposed outside the recess 1700 from the center of the opening of the bobbin 110 in the radial diction The bobbin may be provided on the upper surface thereof with a plurality of protrusions 1113, to which the upper elastic member is coupled. Some of the protrusion 1113 and the recesses 1700 may be disposed in the same quarter surfaces in the x-y plane, which is perpendicular to the first direction.

In an xyz coordinate system, i.e. a three-dimensional rectangular coordinate system, the z axis may be an optical axis.

For example, referring to FIG. 9B, the recesses 1700 and the protrusions 1113 may be disposed in the first quarter surface ① and the third quarter surface ③ in the x-y plane, which is perpendicular to the first direction, i.e. z axis, but no recesses 1700 may be disposed in the second quarter surface ② and the fourth quarter surface ④.

FIG. 9C is a view showing another embodiment of FIG. 9B. Hereinafter, a description of a structure that is identical to the above structure will be omitted. As shown in FIG. 9C, the lens moving apparatus may include a displacement sensing unit 1800 and a third magnet 1900.

The displacement sensing unit 1800 may be mounted to the bobbin and the housing to sense the displacement of the bobbin in the first direction. The displacement sensing unit 1800 may include a second magnet 1810, a position sensor 1820, and a sensor board 1830.

The second magnet 1810 may be disposed at the side surface of the bobbin 1110 so as to be movable with the bobbin 1110 when the bobbin 1110 moves in the first direction.

The position sensor 1820 may be disposed at the housing so as to be opposite the second magnet 1810. The position sensor 1820 may sense a change in a magnetic field due to the movement of the second magnet 1810 in the first direction to measure the displacement of the bobbin 1110 in the first direction. The position sensor 1820 may be, for example, a Hall sensor.

The sensor board 1830 may be disposed at the housing 1140, and the position sensor 1820 may be mounted on the sensor board 1830. The position sensor 1820 may receive external current through the sensor board 1830, and may transmit a sensed signal to an external controller.

The third magnet 1900 may be disposed at the bobbin 1110 so as to be symmetrical with the second magnet 1810 with respect to the center of the bobbin 1110.

When the second magnet 1810 is disposed at one side of the bobbin 1110, the bobbin may not smoothly move in the first direction due to the weight of the second magnet 1810. The balance in load between the third magnet 1900 and the second magnet 1810 may be kept such that bobbin can smoothly move in the first direction. Meanwhile, the lens moving apparatus according to the embodiment may be used in various fields, e.g. for a camera module. For example, the camera module may be used in a mobile device, such as a mobile phone.

A camera module according to an embodiment may include a lens barrel LB2 coupled to the bobbin 1110 and an image sensor (not shown). The lens barrel LB2 may include at least one lens for transmitting an image to the image sensor.

In addition, the camera module may further include an infrared cutoff filter (not shown). The infrared cutoff filter serves to prevent infrared light from being incident on the image sensor.

In this case, the infrared cutoff filter may be provided at the base 1210 shown in FIG. 2 at a position thereof corresponding to the image sensor. The infrared cutoff filter may be coupled to a holder member (not shown). In addition, the holder member may support the lower side of the base 1210.

The base 1210 may be provided with a separate terminal member for electrical conduction with the printed circuit board 1250, or a terminal may be integrally formed using a surface electrode. Also, in the case in which the lens moving apparatus includes a separate board, no separate terminal member may be provided.

Meanwhile, the base 1210 may serve as a sensor holder for protecting the image sensor. In this case, a projecting part may be formed downward along the side of the base 1210, which, however, is not requisite. Although not shown, a separate sensor holder may be disposed under the base 1210.

Figure 10:
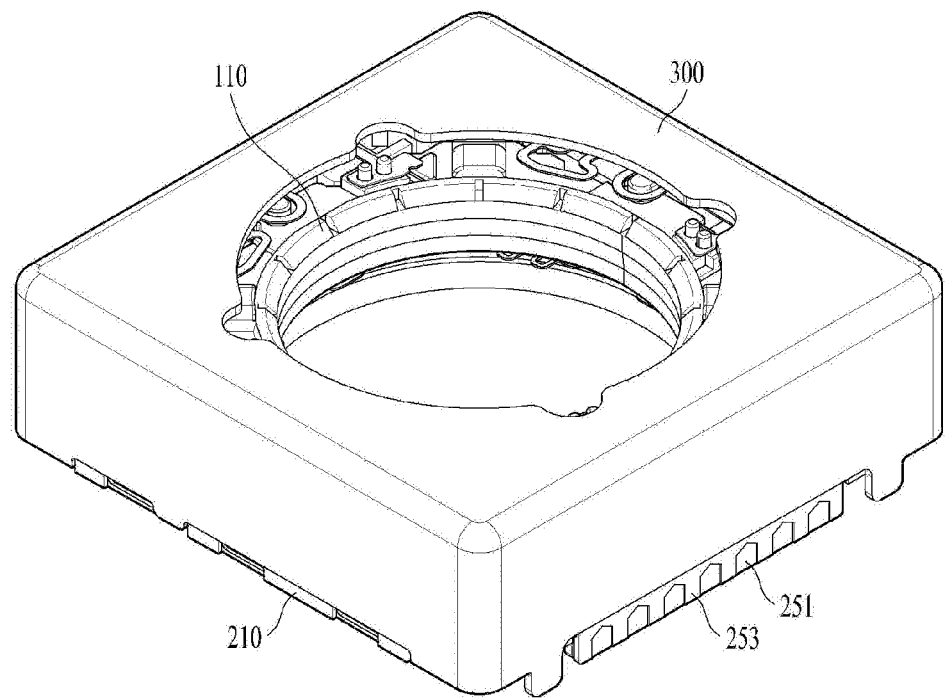
FIG. 10 is a perspective view schematically showing a lens moving apparatus according to another embodiment.
Figure 11A:
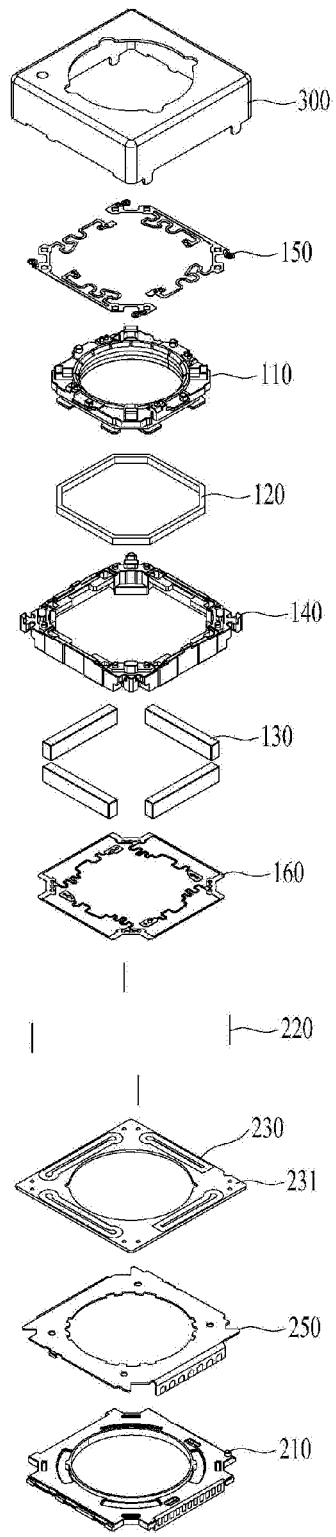
FIG. 11A is an exploded perspective view showing the lens moving apparatus according to the embodiment.

FIG. 10 is a perspective view schematically showing a lens moving apparatus according to another embodiment. FIG. 11A is an exploded perspective view showing the lens moving apparatus according to the embodiment.

An auto-focusing apparatus applied to a small-sized camera module in a mobile device, such as a smartphone or a tablet PC, is an apparatus that automatically focuses an image of a subject on the surface of an image sensor (not shown). The auto-focusing apparatus may be variously configured. In this embodiment, an optical module, including a plurality of lenses, may be moved in the first direction in order to perform an auto-focusing operation.

As shown in FIG. 11A, the lens moving apparatus according to the embodiment may include a moving unit and a stationary unit. The moving unit may perform an auto-focusing function. The moving unit may include a bobbin 110 and a first coil 120. The stationary unit may include a first magnet 130, a housing 140, an upper elastic member 150, and a lower elastic member 160.

The bobbin 110 may be mounted in the housing 140 so as to move in the first direction. The first coil 120, which is disposed in the first magnet 130, may be provided on the outer circumferential surface of the bobbin 110. The bobbin 110 may be mounted in the housing 140 so as to reciprocate in the first direction through electromagnetic interaction between the first magnet 130 and the first coil 120. The first coil 120 may be provided on the outer circumferential surface of the bobbin 110 so as to electromagnetically interact with the first magnet 130.

In addition, the bobbin 110 may move in the first direction in order to perform the auto-focusing function while being elastically supported by the upper and lower elastic members 150 and 160.

The bobbin 110 may include a lens barrel LB (see FIG. 16), in which at least one lens is mounted. The lens barrel LB may be coupled in the bobbin 110 in various manners.

For example, a female screw thread may be formed in the inner circumferential surface of the bobbin 110, and a male screw thread corresponding to the female screw thread may be formed in the outer circumferential surface of the lens barrel LB such that the lens barrel LB is coupled to the bobbin 110 by screw engagement.

However, the disclosure is not limited thereto. No screw thread may be formed in the inner circumferential surface of the bobbin 110, in which case the lens barrel LB may be directly fixed to the inside of the bobbin 110 using a method other than screw engagement.

Alternatively, one or more lenses may be integrally formed with the bobbin 110 without the lens barrel LB. In this embodiment, however, the lens barrel LB and the bobbin 110 are coupled using an adhesive.

One lens may be coupled to the lens barrel LB, or two or more lenses may be provided in order to constitute an optical system.

The auto-focusing function may be controlled by varying the direction of current and/or the amount of current. The bobbin 110 may move in the first direction in order to perform the auto-focusing function.

For example, when forward current is supplied, the bobbin 110 may move upward from the initial position thereof. When reverse current is supplied, the bobbin 110 may move downward from the initial position thereof. Alternatively, the amount of current in one direction may be adjusted to increase or decrease the movement distance of the bobbin 110 in the direction from the initial position thereof.

The bobbin 110 may be provided on the upper surface and the lower surface thereof with a plurality of upper support protrusions and a plurality of lower support protrusions, respectively. The upper support protrusions may be formed in a cylindrical shape or in a prism shape. The upper support protrusions may be coupled and fixed to the upper elastic member 150 in order to guide the upper elastic member 150.

The lower support protrusions may be formed in a cylindrical shape or in a prism shape, in the same manner as the upper support protrusions. The lower support protrusions may be coupled and fixed to the lower elastic member 160 in order to guide the lower elastic member 160.

The upper elastic member 150 may be provided at the upper side of the bobbin 110, and the lower elastic member 160 may be provided at the lower side of the bobbin 110. The upper elastic member 150 and the lower elastic member 160 may be coupled to the bobbin 110 and the housing 140, respectively. The upper elastic member 150 may be provided with through holes and/or recesses corresponding to the upper support protrusions, and the lower elastic member 160 may be provided with through holes and/or recesses corresponding to the lower support protrusions.

The support protrusions may be fixedly coupled to the through holes and/or the recesses by thermal fusion or using an adhesive member, such as epoxy.

The housing 140 may be formed in the shape of a hollow pillar for supporting the first magnet 130. The housing 140 may have an approximately quadrangular shape, and may be disposed in a cover member 300. The first magnet 130 may be coupled to the side surface of the housing 140.

In addition, as described above, the bobbin 110, which is guided by the upper and lower elastic members 150 and 1160 so as to move in the first direction, may be mounted in the housing 140.

In this embodiment, the first magnet 130 may have a bar shape, and may be coupled to or disposed at the side of the housing 140. In another embodiment, the first magnet 130 may have a trapezoidal shape, and may be coupled to or disposed at the corner of the housing 140.

Meanwhile, a single first magnet 130 may be provided, or two or more first magnets 130 may be provided. In addition, a plurality of first magnets may be arranged in the first direction so as to have a multi-layered structure.

The upper elastic member 150 and the lower elastic member 160 may elastically support the upward and/or downward movement of the bobbin 110 in the first direction. Each of the upper elastic member 150 and the lower elastic member 160 may be, for example, a leaf spring.

As shown in FIG. 11A, the upper elastic member 150 may be divided into two parts. Consequently, currents having different polarities and different powers may be supplied to the divided parts of the upper elastic member 150, or may be transmitted through the divided parts of the upper elastic member 150.

In a modification, the lower elastic member 160 may be divided into two parts, and the upper elastic member 150 may have a single structure.

Meanwhile, the upper elastic member 150, the lower elastic member 160, the bobbin 110, and the housing 140 may be assembled by thermal fusion and/or bonding using an adhesive. At this time, thermal fusion may be performed, and then bonding using the adhesive may be performed.

A base 210 may be disposed at the lower side of the bobbin 110 and a printed circuit board 250, and may have an approximately quadrangular shape. The printed circuit board 250 may be located on the base 210. The base 210 may be provided in the surface thereof that faces the part of the printed circuit board 250 at which a terminal surface 253 is formed with a support recess having a size corresponding to the size of the part of the printed circuit board 250 at which the terminal surface 253 is formed. In addition, the base 210 may be disposed at the lower side of the housing 140 so as to be coupled to the cover member 300.

The support recess may be formed inward from the outer circumferential surface of the base 210 by a predetermined depth in order to prevent the part of the printed circuit board 250 at which the terminal surface 253 is formed from protruding outward or to adjust the extent of protrusion of the part of the printed circuit board 250 at which the terminal surface 253 is formed.

A support member 220 may be disposed at the corner of the housing 140. The upper side of the support member 220 may be coupled and connected to the upper elastic member 150, and the lower side of the support member 220 may be coupled to the base 210 and to a board including the printed circuit board 250 and a circuit member 231. The support member 220 may support the bobbin 110 and the housing 140 such that the bobbin 110 and the housing 140 can move in the second direction and/or the third direction, which are perpendicular to the first direction. In addition, the support member 1220 may be connected to the first coil 1120.

The support member 220 may be disposed at the corner of the housing 140 so as to elastically support the housing 140. A plurality of support members 220 may be provided. In this embodiment, four support members 220 may be disposed at respective corners of the housing 140. The support member 220 may be made of an elastic material such that the bobbin 110 and the housing 140 can move in the x-y plane.

In another embodiment, six support members may be provided such that two support members are disposed at each of two corners and one support member is disposed at each of the remaining two corners. Depending on the circumstances, a total of seven or more support members may be provided.

In addition, the support member 220 may be connected to the upper elastic member 150. For example, the support member 220 may be connected to the part of the upper elastic member 150 in which the through holes are formed.

In addition, since the support member 220 is formed separably from the upper elastic member 150, the support member 220 may be connected to the upper elastic member 150 by a conductive adhesive, soldering, or welding. Consequently, the upper elastic member 150 may supply current to the first coil 120 via the support member 220.

The lower part of the support member may be inserted into a through hole formed in the board including the circuit member 231 and the printed circuit board 250 and may be coupled to the board by soldering. That is, the lower part of the support member 220 may be inserted into and soldered to the through hole formed in the circuit member 231 and/or the printed circuit board 250, whereby the support member 220 may be connected to the board.

Alternatively, no through hole may be formed in the circuit member 231 and/or in the printed circuit board 250, and the support member 220 may be soldered to a corresponding part of the circuit member 231.

In FIG. 11A, a linear support member 220 is shown as an embodiment. However, the disclosure is not limited thereto. For example, the support member 220 may be formed in the shape of a sheet member.

The second coil 230 may move the housing 140 in the second direction and/or the third direction through electromagnetic interaction with the first magnet 130, and the support member 220 may be elastically deformed, whereby optical image stabilization may be performed.

Here, the second and third directions may include directions that are substantially close to the x-axis direction (or the first direction) and the y-axis direction (or the second direction), in addition to the x-axis direction and the y-axis direction. That is, in this embodiment, the housing 140 may move parallel to the x-axis and the y-axis. In addition, when the housing 140 moves while being supported by the support member 220, the housing 140 may move in the state of being slightly inclined relative to the x-axis and the y-axis.

Consequently, it is necessary to mount the first magnet 130 to a position corresponding to the second coil 230.

The second coil 230 may be disposed so as to be opposite the first magnet 130 fixed to the housing 140. In an embodiment, the second coil 230 may be disposed outside the first magnet 130. Alternatively, the second coil 230 may be disposed at the lower side of the first magnet 130 so as to be spaced apart from the first magnet 130 by a predetermined distance. Alternatively, the second coil 230 may be disposed at the lower side of the housing 140 so as to be opposite the first magnet 130.

In this embodiment, four second coils 230 may be disposed at four sides of the circuit member 231. However, the disclosure is not limited thereto. Only one second coil may be provided for the second direction, and only one second coil may be provided for the third direction. Alternatively, more than four second coils may be provided.

Alternatively, one second coil may be provided at the first side for the second direction, two second coils may be provided at the second side for the second direction, one second coil may be provided at the third side for the third direction, and two second coils may be provided at the fourth side for the third direction. That is, a total of six second coils may be provided. In this case, the first side and the fourth side may be adjacent to each other, and the second side and the third side may be adjacent to each other.

In this embodiment, a circuit pattern corresponding to the shape of the second coil 230 may be formed on the circuit member 231. Alternatively, a separate second coil may be disposed on the circuit member 231. However, the disclosure is not limited thereto. A circuit pattern corresponding to the shape of the second coil 230 may be directly formed on the circuit member 231.

Alternatively, a wire is wound in the shape of a doughnut in order to form the second coil 230. Alternatively, the second coil 230 may be formed in the shape of an FP coil, which may be connected to the printed circuit board 250.

The circuit member 231 including the second coil 230 may be mounted or disposed at the upper surface of the printed circuit board 250, which is disposed at the upper side of the base 210. However, the disclosure is not limited thereto. The second coil 230 may be in tight contact with the base 210, or may be spaced apart from the base 210 by a predetermined distance. The second coil 230 may be formed on a separate board, which may be stacked on and connected to the printed circuit board 250.

The board may be disposed between the housing 140 and the base 210, and may include the circuit member 231 and the printed circuit board 250. The circuit member 231 and the printed circuit board 250 may be connected to each other.

The circuit member 231 may be provided with the second coil 230, which is disposed so as to be opposite the first magnet 130. The circuit member 231 may be disposed at the upper side of the printed circuit board 250.

The printed circuit board 250 may be disposed at the lower side of the circuit member 231, may be connected to at least one of the upper and lower elastic members 150 and 160, and may be coupled to the upper surface of the base 210. The printed circuit board 250 may be provided at a position thereof corresponding to the end of the support member 220 with a through hole, into which the support member 220 is inserted. Alternatively, no through hole may be formed, and the printed circuit board may be connected or bonded to the support member.

In another embodiment, when the support member 220 is coupled to the circuit member 231, the printed circuit board 250 may be provided at the corner thereof corresponding to the support member 220 with an escape portion for easy coupling, such as soldering, between the support member 220 and the circuit member 231.

The printed circuit board 250 may be coupled to the upper surface of the base 210, may be disposed at the lower side of the circuit member 231, and may be connected to the circuit member 231. The printed circuit board 250 may be provided with a terminal surface 253, which is disposed at the side surface of the base 210 and on which a terminal 251 is disposed. In this embodiment, the printed circuit board 250 has two bent terminal surfaces 253.

A plurality of terminals 251 may be disposed on the terminal surface 253 in order to supply current from an external power source to the first coil 120 and the second coil 230. The number of terminals 251 formed on the terminal surface 253 may be changed depending on the kind of components to be controlled. In addition, the printed circuit board 250 may have one terminal surface 253. Alternatively, the printed circuit board 250 may have two or more terminal surfaces 253.

The cover member 300 may be formed in the shape of a box having corners. The cover member 300 may receive the moving unit, the second coil 230, and a portion or the entirety of the printed circuit board 250, and may be coupled to the base 210. The cover member 300 protects the moving unit, the second coil 230, and the printed circuit board 250 received therein so as to protect the same from damage.

In addition, the cover member 300 may prevent an electromagnetic field generated by the first magnet 130, the first coil 120, and the second coil 230 received therein from leaking to the outside in order to condense the electromagnetic field.

Figure 11B:
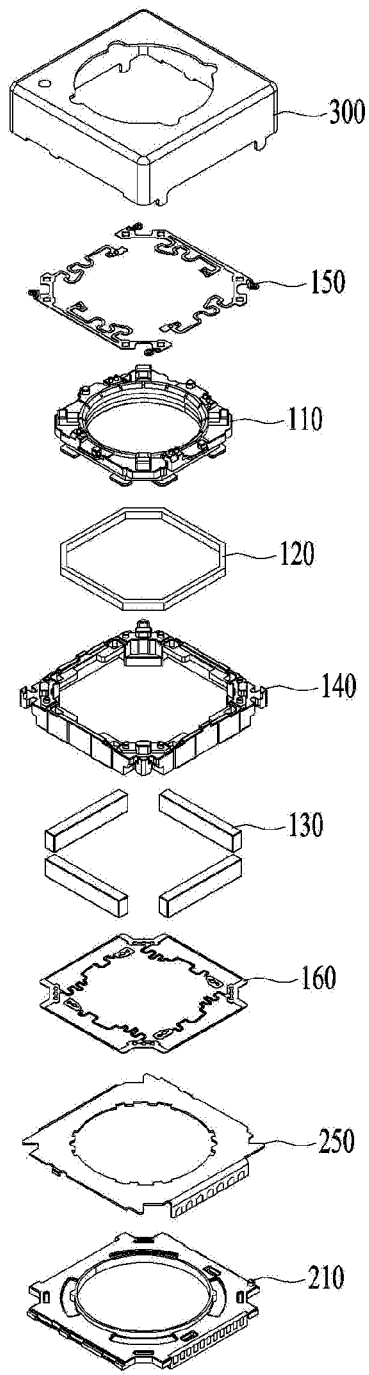
FIG. 11B is an exploded perspective view showing a lens moving apparatus according to another embodiment different from FIG. 11A.

FIG. 11B is an exploded perspective view showing a lens moving apparatus according to another embodiment different from FIG. 11A. Compared to FIG. 11A, the lens moving apparatus according to the embodiment shown in FIG. 11B may not include the support member 220, the second coil 230, and the circuit member 231.

Consequently, the lens moving apparatus according to the embodiment shown in FIG. 11B may not perform an optical image stabilization function but may perform an auto-focusing function. The other constructions of the lens moving apparatus excluding the support member 220, the second coil 230, and the circuit member 231 have already been described with reference to FIG. 11A, and a duplicate description thereof will be omitted.

Figure 12:
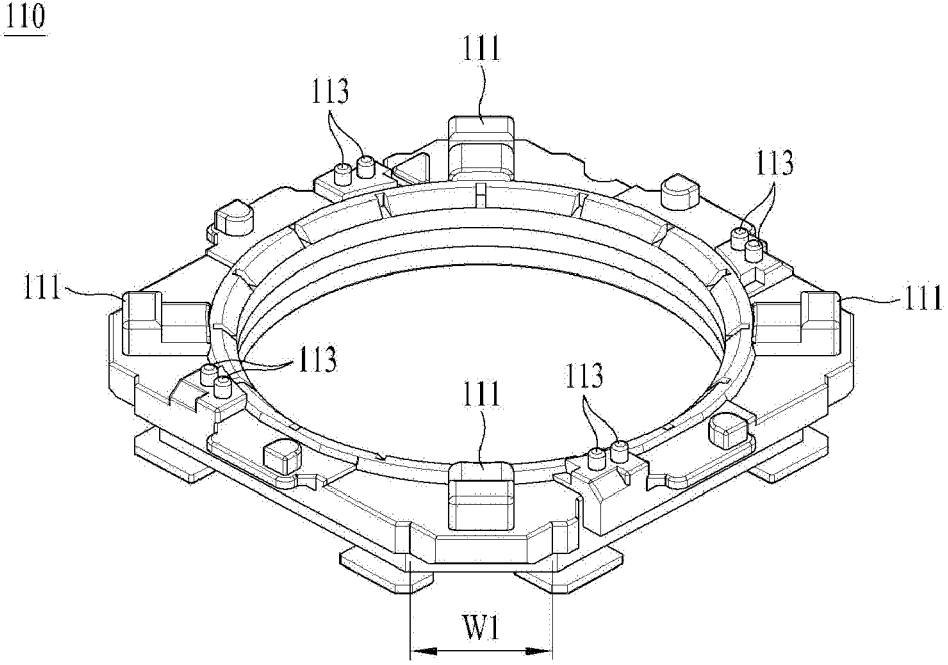
FIG. 12 is a perspective view showing a bobbin according to a further embodiment.

Hereinafter, the structures of the bobbin 110 and the housing 140 will be described in more detail with reference to FIGS. 12 and 13. FIG. 12 is a perspective view showing a bobbin 1110 according to another embodiment.

The bobbin 110 may include a protrusion 113 and a third projecting part 111. The protrusion 113 is a portion that is coupled into the through hole formed in the upper elastic member 150. The protrusion 113 may be formed in a cylindrical shape or any of various other shapes. The protrusion 113 may guide the upper elastic member 150 such that the upper elastic member 150 is coupled to the bobbin 110.

The third projecting part 111 may be formed on the upper surface of the bobbin 110. When external impact is applied, the upper surface of the third projecting part 111 may collide with the lower surface of the cover member 300 in order to prevent plastic deformation exceeding the elastic limit of a spring.

In the case in which the initial position of the bobbin 110 is set to the position at which the bobbin 110 cannot move downward any further, auto-focusing of the bobbin 110 may be controlled in one direction. That is, the bobbin 110 moves upward when the amount of current that is supplied to the first coil 120 increases, and the bobbin 110 moves downward to the initial position thereof when the amount of current that is supplied to the first coil 120 decreases, whereby the auto-focusing function may be performed.

However, in the case in which the initial position of the bobbin 110 is set to provide a distance by which the bobbin 110 can move downward, the auto-focusing of the bobbin 110 may be controlled in opposite directions. That is, the bobbin 110 may move upward or downward in the first direction, whereby the auto-focusing function may be performed.

For example, when forward current is supplied, the bobbin 110 may move upward. When reverse current is supplied, the bobbin 110 may move downward.

Figure 13:
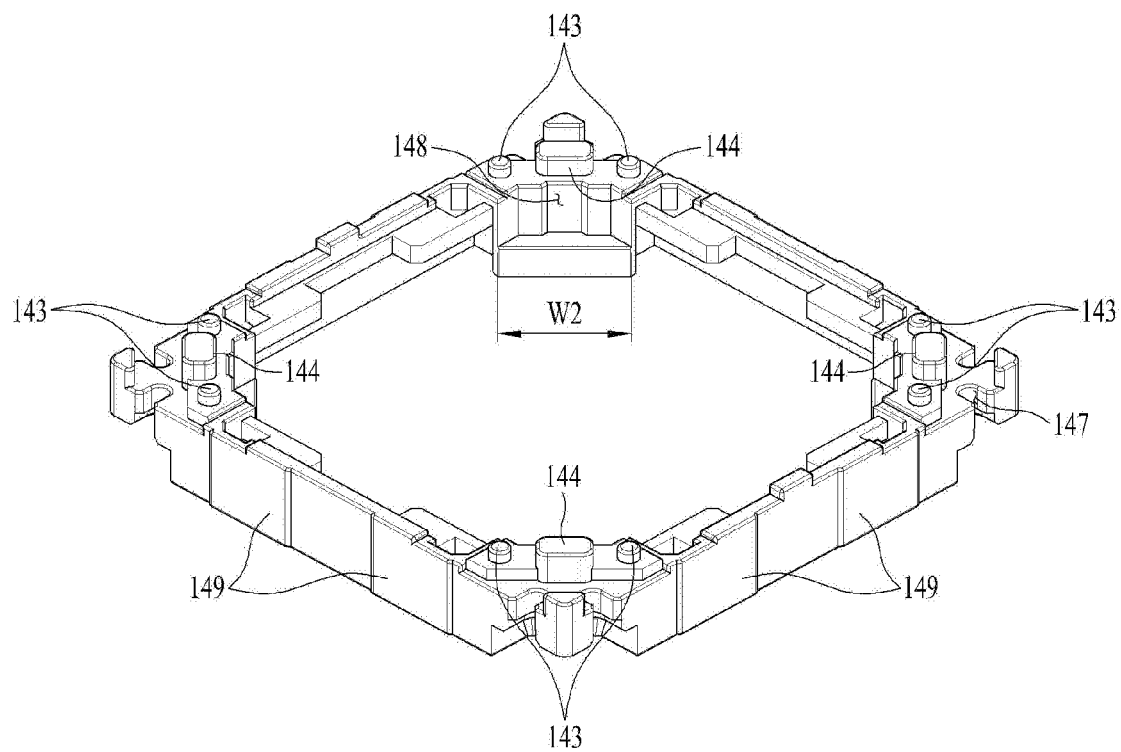
FIG. 13 is a perspective view showing a housing according to a further embodiment.

FIG. 13 is a perspective view showing a housing 140 according to another embodiment. The housing 140 may support the magnet 130, and may receive therein the first bobbin 110, which moves in the first direction.

The housing 140 may be generally formed in the shape of a hollow pillar. For example, the housing 140 may have a polygonal hollow part (e.g. a quadrangular or octagonal hollow part) or a circular hollow part.

The housing 140 may include a second upper support protrusion 143 and a fourth projecting part 144. The second upper support protrusion 143 is a portion that is coupled into the through hole formed in the upper elastic member 150. The second upper support protrusion 143 may be formed in a cylindrical shape or any of various other shapes. The second upper support protrusion 143 may guide the upper elastic member 150 such that the upper elastic member 150 is coupled to the housing 140.

The fourth projecting part 144 may be formed on the upper surface of the housing 140. The fourth projecting part 144 may serve to stop the cover member 300 and the housing 140. That is, when external impact is applied, the upper surface of the fourth projecting part 144 may collide with the lower surface of the cover member 300 in order to prevent the cover member 300 and the housing 140 from directly colliding with each other.

The housing 140 may be provided with a third recessed part 148 at a position thereof corresponding to the part of the bobbin 110 at which a first width W1 is formed.

The surface of the third recessed part 148 in the housing 140 opposite the bobbin 110 may have a shape that matches the first width W1, which is the projecting part of the bobbin 110. Each of the first width W1 of the bobbin 110 shown in FIG. 12 and a second width W2 of the third recessed part 148 in the housing 140 shown in FIG. 13 may have a predetermined tolerance.

Since the third recessed part 148 is disposed so as to match the first width W11 of the bobbin 110, the bobbin 110 may be prevented from rotating relative to the housing 140. Even when force for rotating the bobbin 110 about an optical axis or an axis parallel to the optical axis is applied to the bobbin 110, therefore, the third recessed part 148 in the housing 140 may prevent the rotation of the bobbin 110.

In addition, the housing 140 may be provided in the corner thereof with a second recessed part 147. The support member 220 may extend through the second recessed part 147 in the first direction so as to be connected to the upper elastic member 150.

A pair of second recessed parts 147 may be provided at each corner of the housing 140. In this embodiment, the support member 220 may be disposed so as to extend through one of the second recessed parts 147 formed in one corner of the housing 140.

In another embodiment, a single second recessed part 147 may be provided at each corner of the housing 140. For example, referring to FIG. 15, the second recessed part 147 may be formed in the left upper side of each corner of the housing 140 through which the support member 220 extends, rather than in the right lower side of the corner of the housing 140.

In a further embodiment, a through-hole, through which the support member extends, may be formed in each corner of the housing 140, instead of the second recessed part 147. A single through-hole or a pair of through-holes may be formed in each corner of the housing, in the same manner as the second recessed part 147.

Meanwhile, the housing 140 may be provided at the lower surface of the corner thereof with a lower support protrusion (not shown) for coupling with the lower elastic member 160. The lower support protrusion may be provided at a position corresponding to the upper support protrusion while having a shape corresponding to the shape of the upper support protrusion. However, the disclosure is not limited thereto.

The housing 140 may be provided with a plurality of third stoppers 149 protruding from the respective sides thereof. The third stoppers 149 may serve to prevent the housing 140 from colliding with the cover member 300 when the housing 140 moves in the second and third directions.

Figure 14:
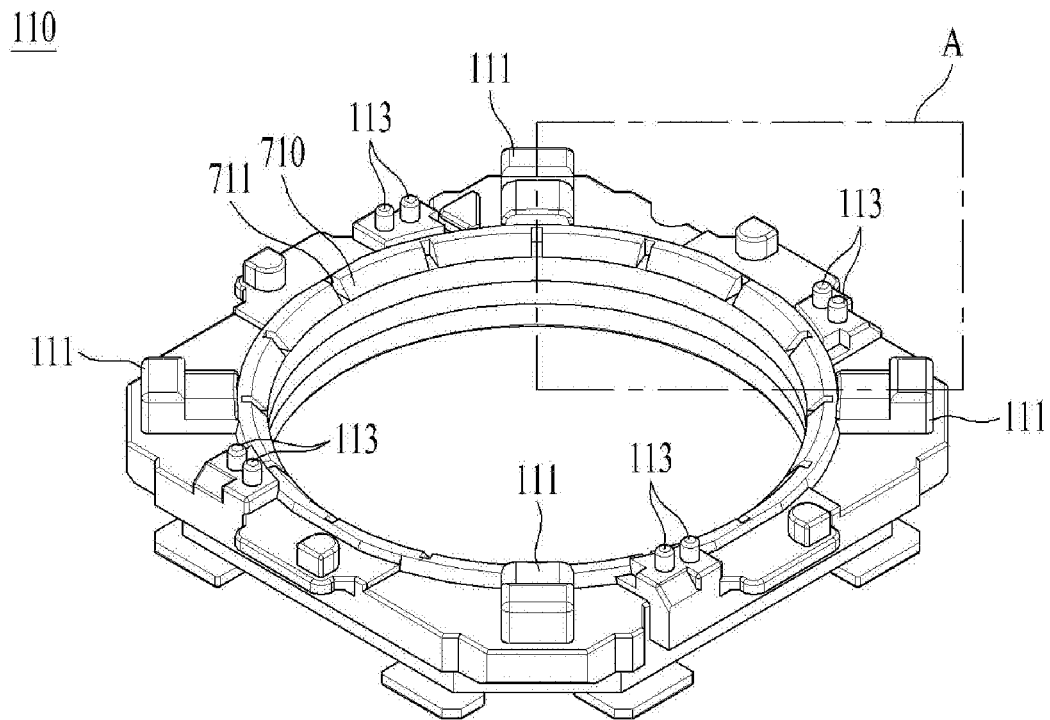
FIG. 14 is a perspective view of the bobbin, illustrating an application extension region according to an embodiment.
Figure 15:
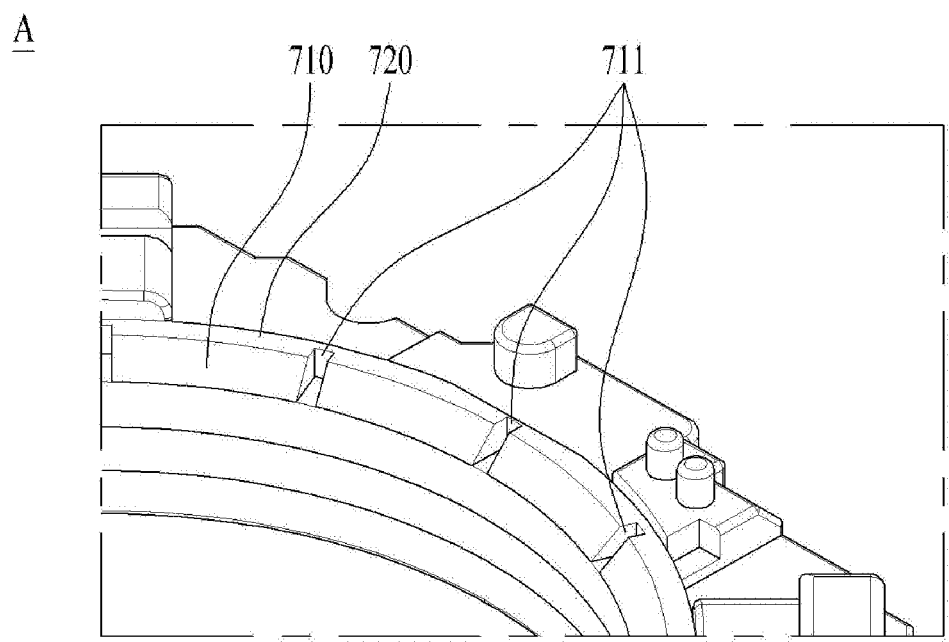
FIG. 15 is an enlarged view showing part A of FIG. 14.

FIG. 14 is a perspective view of the bobbin 110, illustrating an application extension region according to an embodiment. FIG. 15 is an enlarged view showing part A of FIG. 14. As shown in FIGS. 14 and 15, the application extension region may be formed at the bobbin 110 in the lens moving apparatus according to the embodiment.

In the lens moving apparatus according to the embodiment, a lens barrel LB may be provided, and the lens barrel LB may be coupled to the bobbin 110 using an adhesive.

The application extension region may serve to increase the area of the adhesive that is applied to the region of the bobbin 110 at which the lens barrel LB is coupled to the bobbin 110. The application extension region may be formed at the edge of the bobbin, whereby the application extension region may be referred to as an edge region.

Figure 18:
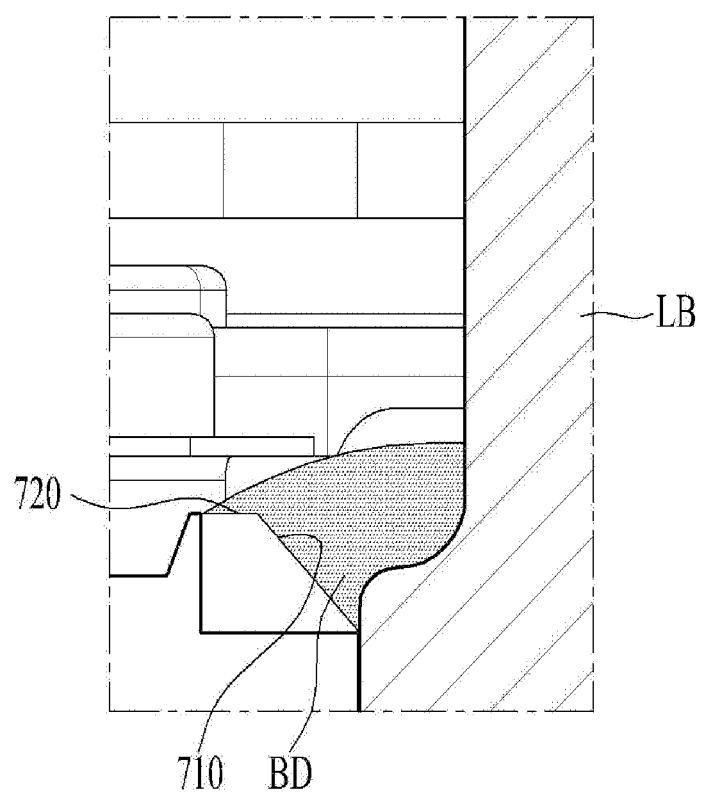
FIG. 18 is an enlarged view showing part B of FIG. 17.

Referring to FIG. 18, a description of which will follow, a bonding part BD, to which an adhesive is applied, may be formed between the upper part of the inner circumference of the bobbin 110 and the outer circumference of the lens barrel LB. The bobbin 110 and the lens barrel LB may be coupled to each other by the bonding part BD.

The adhesive, which couples the bobbin 110 and the lens barrel LB to each other, may peel off from the lens barrel LB when external impact is applied after the adhesive is hardened.

For example, when external impact is applied to the hardened adhesive, the adhesive may crack. As the lens moving apparatus is continuously used, external impact may be continuously and uninterruptedly applied to the hardened adhesive.

Cracks generated in the adhesive may grow due to continuous and uninterrupted external impact. Eventually, the adhesive may peel off from the adhesive region of the bobbin 110 and the lens barrel LB due to the cracks.

When the adhesive peels off, pieces of the adhesive that has peeled off may be introduced into the respective components of the lens moving apparatus, with the result that the lens moving apparatus may be damaged.

At worst, the lens barrel LB may be separated from the bobbin 110 due to the peeling off of the adhesive, with the result that the lens moving apparatus may be damaged to the extent that the lens moving apparatus cannot operate.

In order to solve the above problem, it is necessary for the adhesive to have sufficient adhesive force to resistant peeling off even when continuous and uninterrupted external impact is applied.

In this embodiment, the application extension region may be formed at the bobbin 110 in order to increase the adhesive force of the adhesive, which couples the bobbin 110 and the lens barrel LB, with respect to the bobbin 110. As described above, the application extension region may serve to increase the area of the adhesive that is applied.

When the same adhesive is used, the adhesive force of the adhesive may increase in proportion to the area of the adhesive that is applied. Consequently, the application extension region may be formed as, for example, an inclined surface 710.

That is, as shown in FIGS. 14 and 15, the application extension region may include an inclined surface 710 that is formed on the upper part of the inner circumferential surface of the bobbin 110 so as to be inclined with respect to the first direction. The inclined surface 710 may be generally formed along the inner circumference of the bobbin 110 in a ring shape.

In addition, as shown in FIG. 14, the inclined surface 710 may be disposed so as to surround the lens barrel LB in the x-y plane, which is perpendicular to the first direction.

If the inclined surface 710 is not provided, most of the adhesive is applied to the upper end of the inner circumference of the bobbin 110, i.e. an upper plane surface 720.

Since a gap defined between the inner circumferential surface of the bobbin 110 and the lens barrel LB is very small, the adhesive hardly flows to the inner circumferential surface of the bobbin 110 through the gap.

As a result, most of the adhesive is applied to the upper plane surface 720 of the bobbin 110 and the outer circumferential surface of the lens barrel LB, which are perpendicular to each other, whereby the coupling force of the adhesive to the bobbin 110 and the lens barrel LB may be low after the adhesive has hardened.

In the case in which the inclined surface 710 is formed, as in this embodiment, the adhesive may be applied to the upper plane surface 720 and the inclined surface 710 of the bobbin 110. In addition, the adhesive may also be applied to the outer circumferential surface of the lens barrel LB corresponding to the height of the inclined surface 710 in the first direction.

As the inclined surface 710 is formed at the bobbin 110, therefore, the adhesive may be applied to the upper plane surface 720, the inclined surface 710 of the bobbin 110, and the outer circumferential surface of the lens barrel LB corresponding to the height of the inclined surface 710 in the first direction. Consequently, the area of the adhesive that is applied may greatly increase compared to the case in which the inclined surface 710 is not formed.

As a result of an increase in the area of the adhesive that is applied, the adhesive force of the adhesive to the bobbin 110 and the lens barrel LB greatly increases, whereby the feeling off of the adhesive due to external impact may be effectively prevented.

Meanwhile, as shown in FIGS. 14 and 15, the application extension region may include a plurality of recesses 711 formed by recessing a portion of the inclined surface 710.

A portion of each recess 711 may be formed in the inclined surface 710 of the bobbin 110 and the remainder of each recess 711 may be formed in the upper plane surface 720 of the bobbin 110, whereby the recesses 711 may be formed over the inclined surface 710 and the upper plane surface 720 of the bobbin 110.

When the adhesive is applied to the upper plane surface 720 and the inclined surface 710, the adhesive may be introduced into the recesses 711, whereby the area of the adhesive that is applied to the bobbin 110 may increase. As the area of the adhesive that is applied to the bobbin 110 increases due to the recesses 711, the coupling force of the adhesive to the bobbin 110 may increase.

The recesses 711 may be disposed so as to be symmetrical with respect to the center of the bobbin 110, and may be arranged at predetermined intervals. The size of each recess 711 and the distance between the recesses 711 may be appropriately chosen in consideration of the overall structure and size of the lens moving apparatus and the required coupling force of the adhesive.

Figure 16:
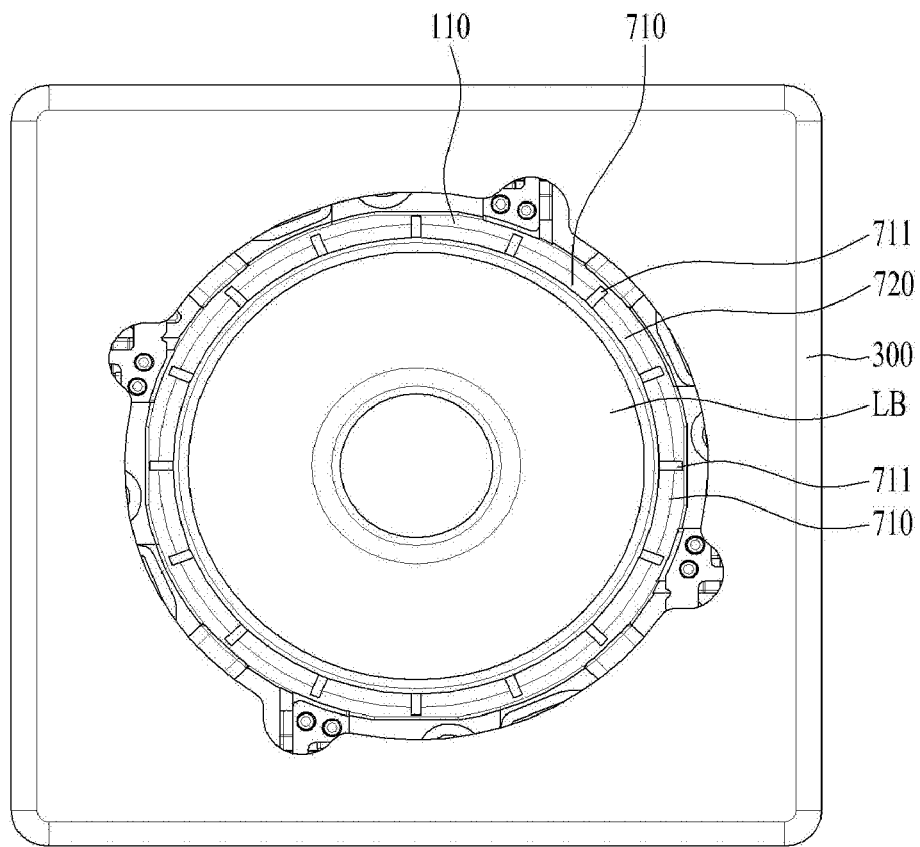
FIG. 16 is a plan view showing the lens moving apparatus according to the embodiment.
Figure 17:
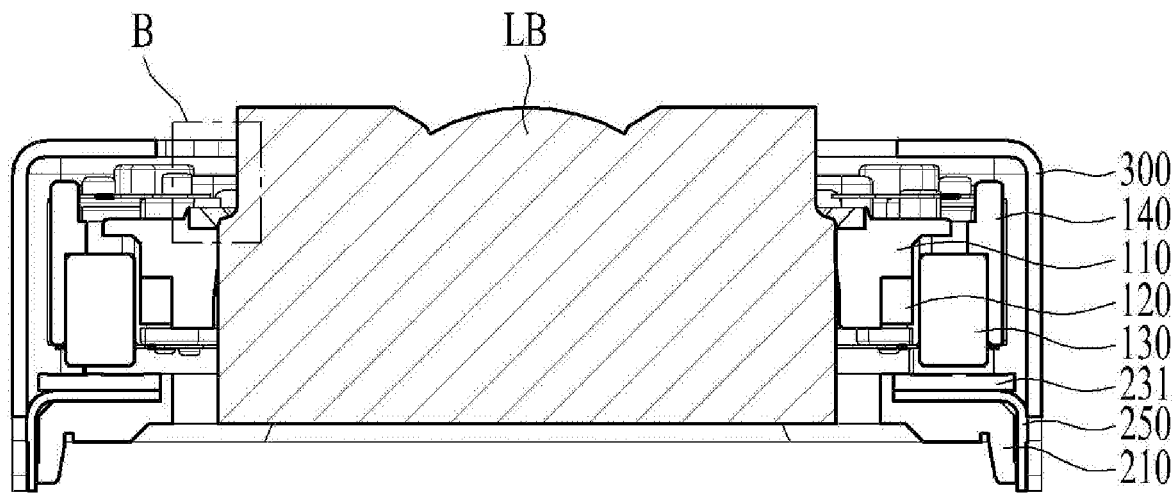
FIG. 17 is a sectional view showing the lens moving apparatus according to the embodiment.

FIG. 16 is a plan view showing the lens moving apparatus according to the embodiment. FIG. 17 is a sectional view showing the lens moving apparatus according to the embodiment. FIG. 18 is an enlarged view showing part B of FIG. 17.

Referring to FIG. 16, in the case in which the lens barrel LB is inserted into the inner circumference of the bobbin 110, the inclined surface 710, the upper plane surface 720, and the recesses 711 may be disposed so as to surround the lens barrel LB.

The adhesive is applied and hardened to the inclined surface 710, the upper plane surface 720, and the recesses 711 and to the outer circumferential surface of the lens barrel LB corresponding thereto, whereby the lens barrel LB is coupled to the bobbin 110.

As the adhesive is applied and hardened to the lens barrel LB and the bobbin 110, as shown in FIG. 18, a bonding part BD, by which the lens barrel LB is coupled to the bobbin 110, may be formed.

For example, a UV-curable adhesive, epoxy, or a thermosetting adhesive may be used as the adhesive that forms the bonding part BD.

One side of the bonding part BD may be bonded to the inclined surface 710, the upper plane surface 720, and the recesses 711 of the bobbin 110, and the other side may be bonded to the outer circumferential surface of the adhesive.

In particular, as the inclined surface 710 is formed at the bobbin 110, the bonding part BD may be easily bonded to the outer circumferential surface of the lens barrel LB corresponding to the height of the inclined surface 710 in the first direction.

That is, the inclined surface 710 extends the region to which the adhesive is applied on the outer circumferential surface of the lens barrel LB as well as the bobbin 110, whereby the adhesion area of the bonding part BD on the outer circumferential surface of the lens barrel LB formed by the adhesive may increase.

As the adhesion area of the bonding part BD on the outer circumferential surface of the lens barrel LB increases, the coupling force of the bonding part BD to the lens barrel LB may considerably increase.

Figure 19:
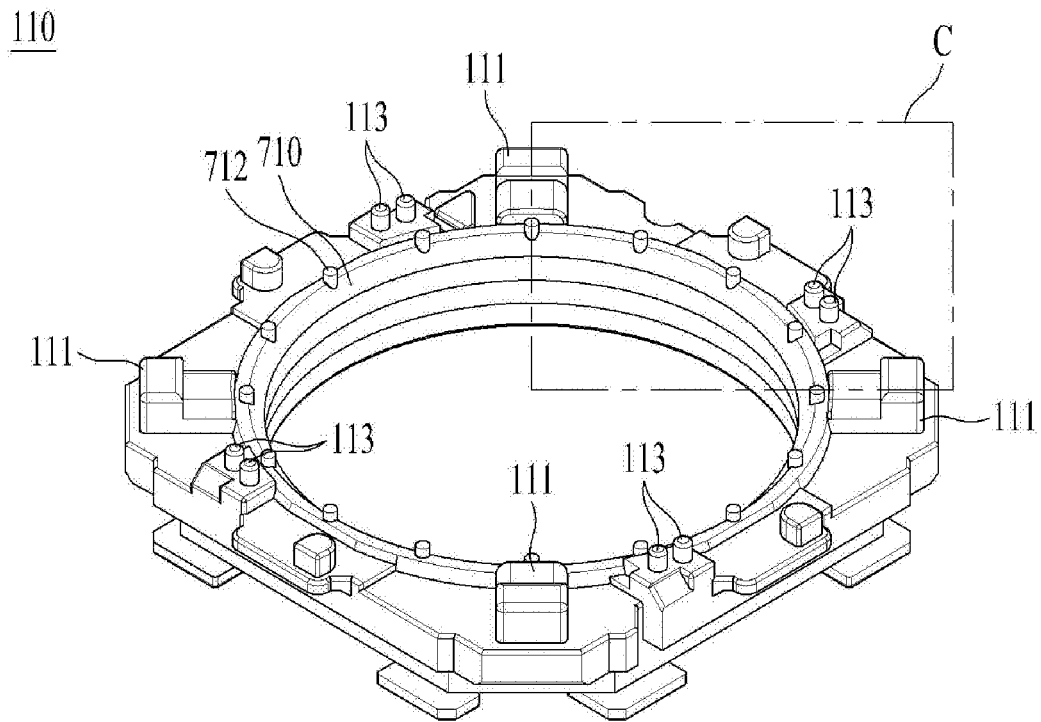
FIG. 19 is a perspective view of the bobbin, illustrating an application extension region according to another embodiment.
Figure 20:
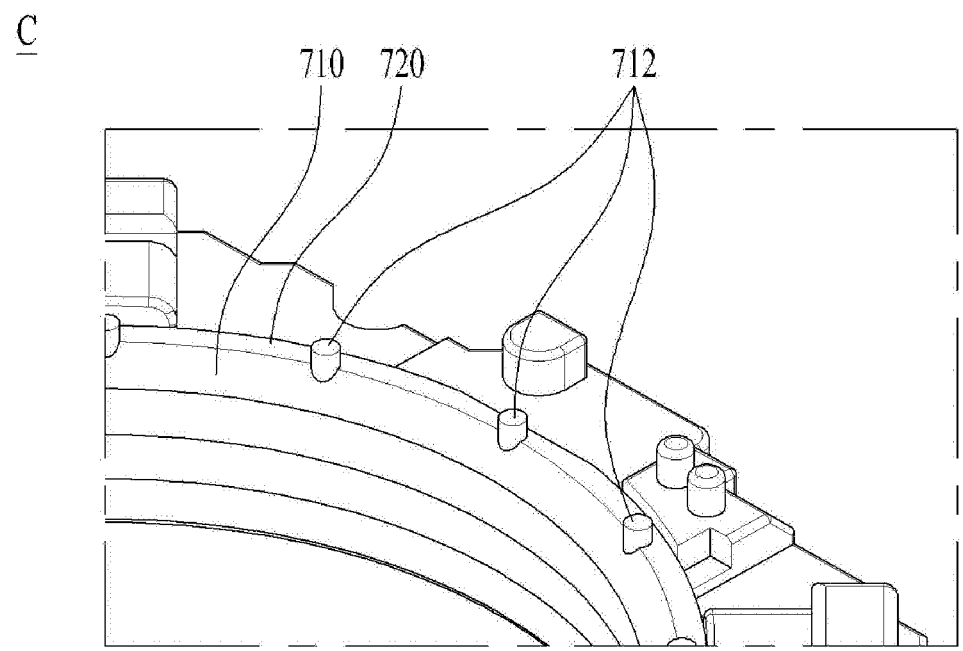
FIG. 20 is an enlarged view showing part C of FIG. 19.

FIG. 19 is a perspective view of the bobbin 110, illustrating an application extension region according to another embodiment. FIG. 20 is an enlarged view showing part C of FIG. 19.

As shown in FIGS. 19 and 20, the application extension region may include a plurality of bosses 712, a portion of each of which protrudes from the inclined surface 710.

For example, a portion of each of the bosses 712 may be located on the inclined surface 710, and the remainder of each of the bosses 712 may be located in the upper plane surface 720 of the bobbin 110, whereby the bosses 712 may be formed over the inclined surface 710 and the upper plane surface 720 of the bobbin 110.

The bosses 712 may increase the area of the adhesive that is applied, in the same manner as the recesses 711. That is, when the adhesive is applied to the upper plane surface 720 and the inclined surface 710, the adhesive may be applied to the surfaces of the bosses 712, whereby the area of the adhesive that is applied to the bobbin 110 may increase.

As the area of the adhesive that is applied to the bobbin 110 increases due to the bosses 712, the coupling force of the adhesive to the bobbin 110 may increase.

Meanwhile, the bosses 712 may be disposed so as to be symmetrical with respect to the center of the bobbin 110, and may be arranged at predetermined intervals. The size of each boss 712 and the distance between the bosses 712 may be appropriately chosen in consideration of the overall structure and size of the lens moving apparatus and the required coupling force of the adhesive.

Figure 21:
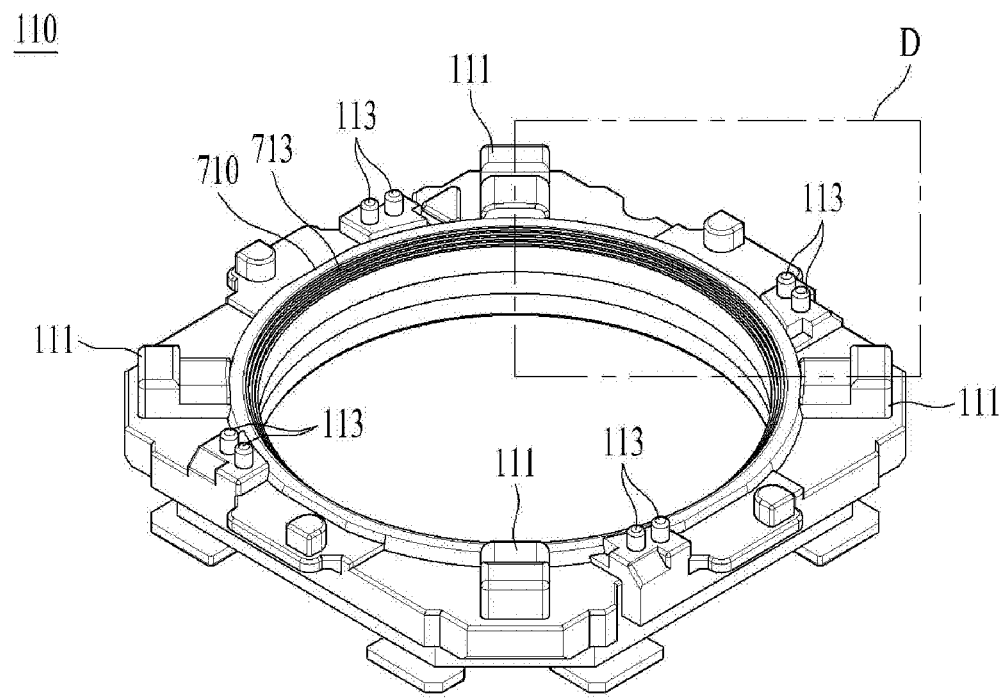
FIG. 21 is a perspective view of the bobbin, illustrating an application extension region according to a further embodiment.
Figure 22:
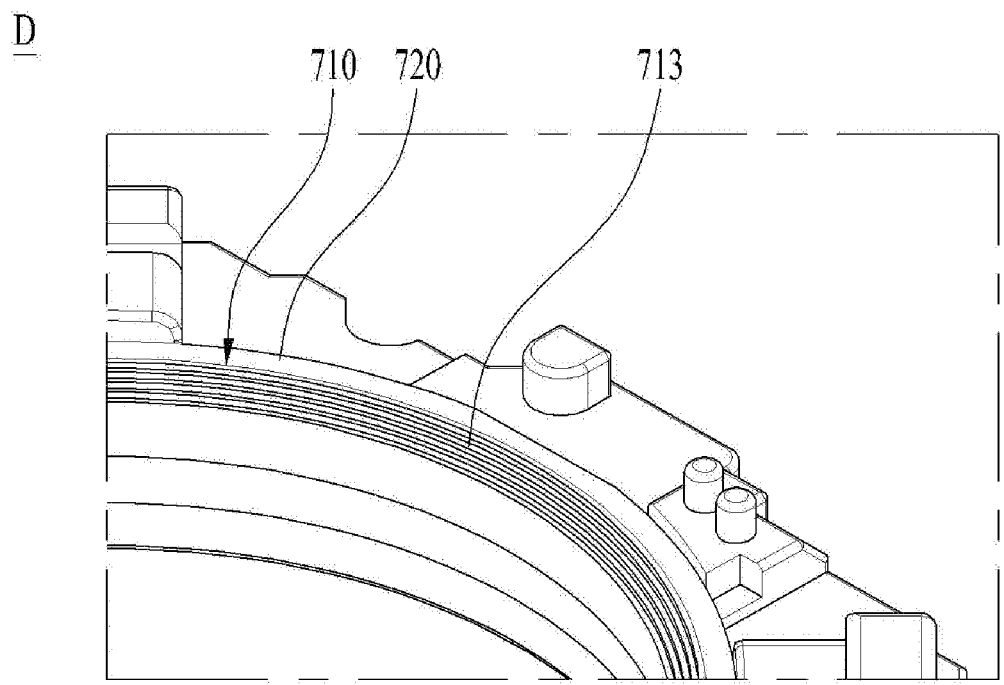
FIG. 22 is an enlarged view showing part D of FIG. 21.

FIG. 21 is a perspective view of the bobbin 110, illustrating an application extension region according to a further embodiment. FIG. 22 is an enlarged view showing part D of FIG. 21.

As shown in FIGS. 21 and 22, the application extension region may include a step 713 formed on the inclined surface 710. For example, a plurality of steps 713 may be provided in the lateral direction of the inclined surface 710.

The steps 713 may increase the area of the adhesive that is applied, in the same manner as the recesses 711 or the bosses 712.

That is, when the adhesive is applied to the inclined surface 710, on which the steps 713 are formed, the adhesive may be applied to the vertical surfaces and the horizontal surfaces of the steps 713, whereby the area of the adhesive that is applied to the bobbin 110 may increase.

As described above, the steps 713 may be provided in the lateral direction of the inclined surface 710. The number of steps 713 and the width of each step 713 may be appropriately chosen in consideration of the overall structure and size of the lens moving apparatus and the required coupling force of the adhesive.

In the above embodiment, the application extension region forms the inclined surface 710, and the inclined surface 710 may increase the area of the adhesive that is applied to the bobbin 110 and the lens barrel LB. As the area of the adhesive that is applied increases, the coupling force of the adhesive for coupling the bobbin 110 and the lens barrel LB to each other may increase.

In addition, the application extension region may include the recesses 711, the bosses 712, or the steps 713, which may increase the area of the adhesive that is applied together with the inclined surface 710. Consequently, the coupling force of the adhesive for coupling the bobbin 110 and the lens barrel LB to each other may increase.

In addition, as the coupling force of the adhesive increases, the adhesive may be prevented from feeling off even when external impact is continuously and uninterruptedly applied to the lens moving apparatus, whereby damage to the lens moving apparatus may be prevented.

Meanwhile, the lens moving apparatus according to the embodiment described above may be used in various fields, e.g. for a camera module. For example, the camera module may be applied to a mobile device, such as a mobile phone.

A camera module according to an embodiment may include a lens barrel LB coupled to the bobbin 110 and an image sensor (not shown). The lens barrel LB may include at least one lens for transmitting an image to the image sensor.

In addition, the camera module may further include an infrared cutoff filter (not shown). The infrared cutoff filter serves to prevent infrared light from being incident on the image sensor.

In this case, the infrared cutoff filter may be provided at the base 210 shown in FIG. 11A at a position thereof corresponding to the image sensor. The infrared cutoff filter may be coupled to a holder member (not shown). In addition, the holder member may support the lower side of the base 210.

The base 210 may be provided with a separate terminal member for electrical conduction with the printed circuit board 250, or a terminal may be integrally formed using a surface electrode. Also, in the case in which the lens moving apparatus includes a separate board, no separate terminal member may be provided.

Meanwhile, the base 210 may serve as a sensor holder for protecting the image sensor. In this case, a projecting part may be formed downward along the side of the base 210, which, however, is not requisite. Although not shown, a separate sensor holder may be disposed under the base 210.

Figure 23:
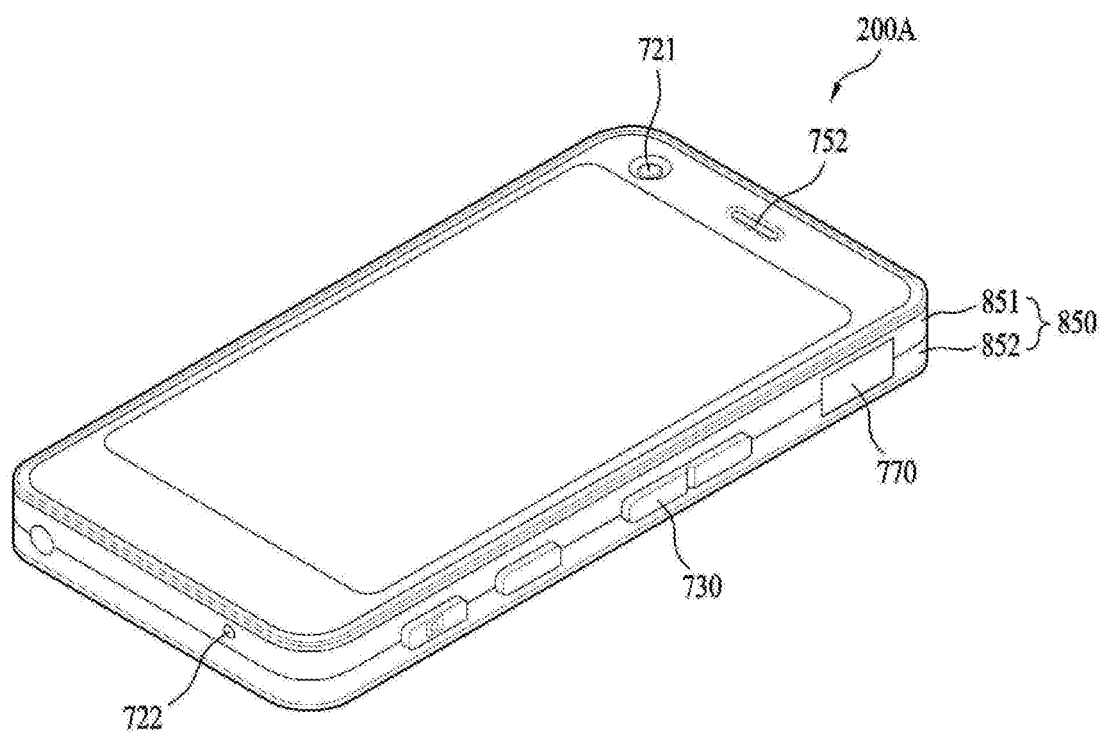
FIG. 23 is a perspective view showing a portable device according to an embodiment.
Figure 24:
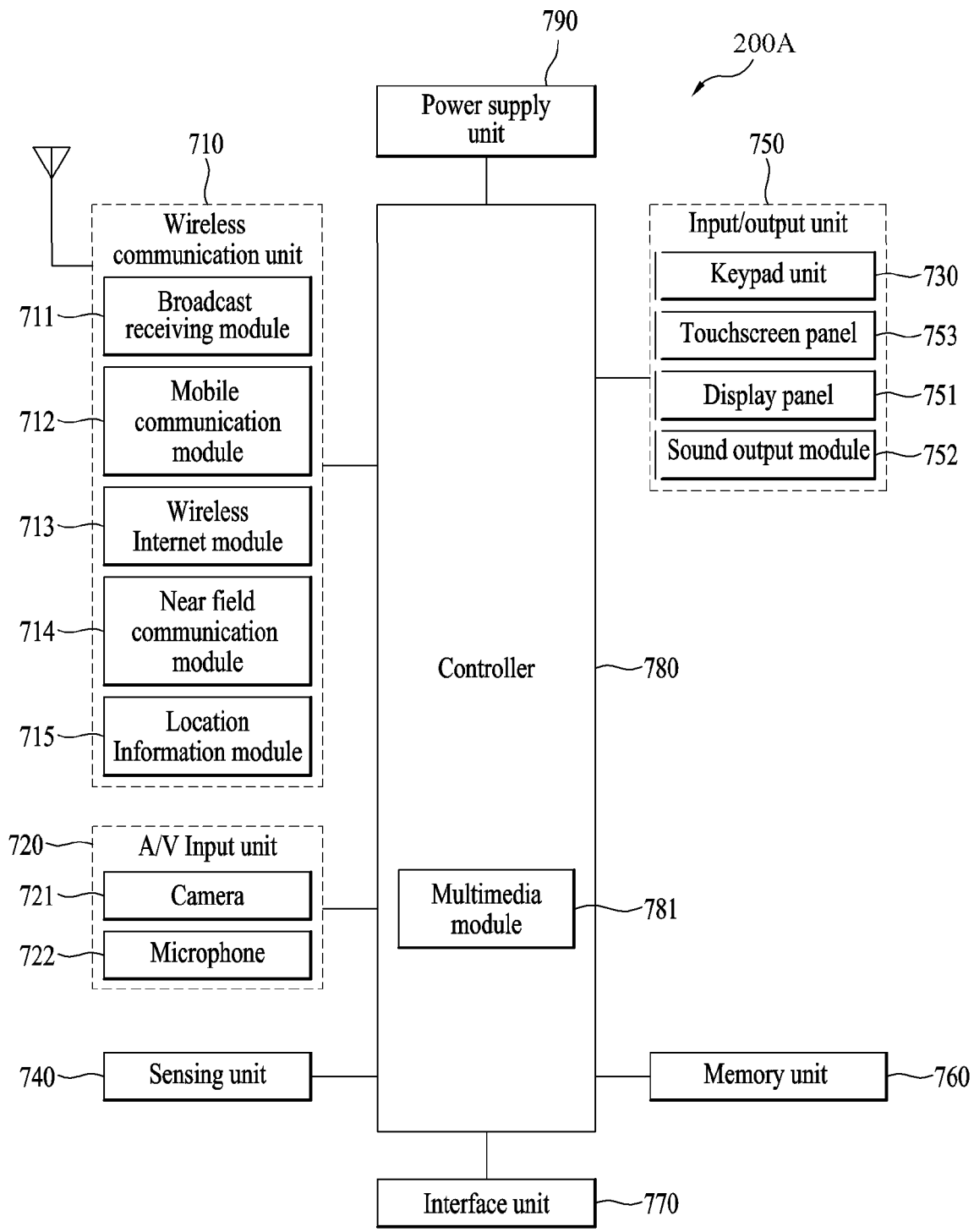
FIG. 24 is a block diagram of the portable device shown in FIG. 23.

FIG. 23 is a perspective view showing a portable device 200A according to an embodiment. FIG. 24 is a block diagram of the portable device 200A shown in FIG. 23.

Referring to FIGS. 23 and 24, the portable device 200A (hereinafter, referred to as the "device") may include a main body 850, a wireless communication unit 710, an audio/video (A/V) input unit 720, a sensing unit 740, an input/output unit 750, a memory unit 760, an interface unit 770, a controller 780, and a power supply unit 790.

Various kinds of electronic parts of the device may be mounted in a space defined between a front case 851 and a rear case 852 of the main body 850.

The wireless communication unit 710 may include a broadcast receiving module 711, a mobile communication module 712, a wireless Internet module 713, a near field communication module 714, and a location information module 715.

The A/V input unit 720 may be provided for inputting an audio signal or video signal. The A/V input unit 720 may include a camera 721 and a microphone 722.

The camera 721 may be a camera including the lens moving apparatus 100 according to the embodiment.

The sensing unit 740 may sense the current state of the device 200A, such as whether the device 200A is in an open or closed state, the location of the device 200A, whether a user has contacted the device 200A, the azimuth of the device 200A, or the acceleration/deceleration of the device 200A, and may generate a sensing signal for controlling the operation of the device 200A. In addition, the sensing unit 740 may sense whether power has been supplied from the power supply unit 790 or whether an external device has been coupled to the interface unit 770.

The input/output unit 750 may generate input or output related to visual sensation, auditory sensation, or tactile sensation. The input/output unit 750 may generate input data for controlling the operation of the device 200A. In addition, the input/output unit 750 may display information processed by the device 200A.

The input/output unit 750 may include a keypad unit 730, a display panel 751, a sound output module 752, and a touchscreen panel 753. The keypad unit 730 may generate input data via keypad input.

The display panel 751 may include a plurality of pixels, the colors of which are changed according to an electrical signal.

In a call signal receiving mode, a telephone conversation mode, a recording mode, a voice recognition mode, or a broadcast receiving mode, the sound output module 752 may output audio data received from the wireless communication unit 710 or may output audio data stored in the memory unit 760.

The touchscreen panel 753 may convert a change in capacitance generated by a user touch on a specific region thereof into an electrical input signal.

The memory unit 760 may store programs for processing or control of the controller 780, input/output data, and images captured by the camera 721.

The interface unit 770 may receive data from an external device, may supply power to the respective components of the device 200A, or may transmit data from the device 200A to the external device. The controller 780 may control the overall operation of the device 200A.

The controller 780 may include a multimedia module 782 for multimedia reproduction. The controller 780 may perform a pattern recognition process of recognizing a writing input or a picture input performed on the touchscreen panel as text or an image.

The power supply unit 790 may supply external power or internal power to the respective components of the device 200A under the control of the controller 780.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
a cover member comprising an upper plate having an opening;
a bobbin disposed in the cover member; and
a first coil and a first magnet disposed between the bobbin and the cover member,
wherein the bobbin comprises:
an upper surface comprising a first region and a second region having a length less than a length of the first region in a direction crossing and perpendicular to an optical axis, and
a recess formed in the first region of the upper surface of the bobbin, and
wherein the cover member comprises a recess formed in the upper plate and corresponding to the recess of the bobbin.

2. The lens moving apparatus according to claim 1, comprising a housing disposed in the cover member,
wherein the bobbin is disposed on the housing,
wherein the bobbin comprises a first projecting portion and a second projecting portion,
wherein the housing comprises a first recessed part and a second recessed part, and
wherein at least a portion of the first projecting portion is disposed in the first recessed part of the housing, and at least a portion of the second projecting portion is disposed in the second recessed part of the housing.

3. The lens moving apparatus according to claim 2, wherein the first coil is disposed on the bobbin, and the first magnet is disposed on the housing.

4. The lens moving apparatus according to claim 2, comprising:
an upper elastic member disposed on the upper surface of the bobbin and coupled to the bobbin and the housing,
a circuit member comprising a second coil disposed under the housing so as to be opposite the first magnet;
a circuit board disposed under the circuit member, the circuit board being electrically connected to the circuit member;
a support member electrically connecting the upper elastic member and the circuit board; and
a base disposed under the circuit board.

5. The lens moving apparatus according to claim 4, wherein the bobbin comprises a protrusion disposed on the upper surface thereof and coupled to the upper elastic member, and
wherein the recess of the bobbin has a larger diameter than the protrusion of the bobbin.

6. The lens moving apparatus according to claim 5, wherein the protrusion of the bobbin comprises a first protrusion and a second protrusion,
wherein the recess of the bobbin is closer to the first protrusion of the bobbin than the second protrusion of the bobbin,
wherein a circumference of the recess of the bobbin has a closed loop shape.

7. The lens moving apparatus according to claim 5,
wherein the bobbin comprises a plurality of protrusions disposed on the upper surface thereof, and
wherein at least one of the plurality of protrusions and any one of the first and second recesses of the bobbin are disposed on a same quarter surface in an x-y plane that is perpendicular to the optical-axis direction.

8. The lens moving apparatus according to claim 2,
wherein an upper surface of the first projecting portion and an upper surface of the second projecting portion comprises the first region of the upper surface of the bobbin, and
wherein the first projecting portion and the second projecting portion are disposed so as to be symmetrical with respect to the optical axis.

9. The lens moving apparatus according to claim 8,
wherein the recess of the bobbin comprises a first recess on the upper surface of the first projecting portion and a second recess on the upper surface of the second projecting portion,
wherein the first recess is disposed at a position adjacent to a first corner of the cover member and the second recess is disposed at a position adjacent to a second corner of the cover member.

10. The lens moving apparatus according to claim 9,
wherein the recess of the cover member comprises a first escape recess and a second escape recess,
wherein the first escape recess of the cover member overlaps the first recess of the bobbin in the optical-axis direction, and the second escape recess of the cover member overlaps the second recess of the bobbin in the optical-axis direction.

11. The lens moving apparatus according to claim 9, wherein a lower surface of the first projecting portion is opposite to a bottom surface of the first recessed part of the housing in the optical-axis direction, and a lower surface of the second projecting portion is opposite to a bottom surface of the second recessed part of the housing in the optical-axis direction.

12. The lens moving apparatus according to claim 11, wherein the lower surface of the first projecting portion and the bottom surface of the first recessed part of the housing are spaced apart from each other by a first distance in the optical-axis direction at an initial position of the bobbin,
wherein the lower surface of the second projecting portion and the bottom surface of the second recessed part of the housing are spaced apart from each other at the initial position of the bobbin, and
wherein a depth of each of the first and second recesses is equal to or greater than the first distance or a maximum downward stroke length of the bobbin from the initial position of the bobbin.

13. The lens moving apparatus according to claim 2, comprising:
a displacement sensing unit disposed on the bobbin and the housing to sense a displacement of the bobbin in the optical-axis direction,
wherein the displacement sensing unit comprises:
a second magnet disposed on a side surface of the bobbin so as to be movable with the bobbin when the bobbin moves in the optical-axis direction;
a position sensor disposed at the housing so as to be opposite the second magnet; and
a sensor board disposed on the housing, the position sensor being mounted on the sensor board.

14. The lens moving apparatus according to claim 13, comprising a third magnet disposed on the bobbin so as to be symmetrical with the second magnet with respect to the optical axis.

15. The lens moving apparatus according to claim 1, wherein the recess of the bobbin is configured to couple a jig for inhibiting rotation of the bobbin when a lens barrel is coupled to the bobbin, and wherein a screw thread is formed in an inner circumferential surface of the bobbin.

16. The lens moving apparatus according to claim 1, wherein a diameter of an upper portion of the recess of the bobbin is greater than a diameter of a lower portion of the recess of the bobbin.

17. A lens moving apparatus comprising:
a cover member comprising an upper plate having an opening;
a bobbin disposed in the cover member; and
a first coil and a first magnet disposed between the bobbin and the cover member
wherein the bobbin comprises a recess formed in an upper surface of the bobbin,
wherein a circumference of the recess of the bobbin has a closed loop shape,
wherein the opening of the cover member comprises an escape recess,
wherein the escape recess corresponds to the recess of the bobbin, and
wherein the recess of the bobbin is exposed through the escape recess of the opening of the cover member.

18. The lens moving apparatus according to claim 17, comprising:
a housing disposed in the cover;
an upper elastic member coupled to the bobbin and the housing;
a circuit board disposed under the housing;
a second coil disposed on the circuit board; and
a support member electrically connecting the upper elastic member and the circuit board.

19. The lens moving apparatus according to claim 17, wherein the recess of the bobbin comprises two recesses spaced apart from each other, and
wherein the escape recess comprises two escape recesses respectively corresponding to the two recesses of the bobbin.

20. The lens moving apparatus according to claim 17, wherein the upper surface of the bobbin comprises a first region and a second region having a length less than a length of the first region in a direction crossing and perpendicular to an optical axis, and
wherein the recess of the bobbin is formed in the first region of the upper surface of the bobbin.

21. A camera module comprising:
the lens moving apparatus according to claim 1;
a lens; and
an image sensor provided so as to be opposite the lens in the optical-axis direction.

22. A portable device comprising:
a display panel comprising a plurality of pixels, colors of which are changed according to an electrical signal;
a camera module according to claim 21 for converting an image incident through a lens into an electrical signal; and
a controller for controlling operation of the display panel and the camera module.

* * * * *